(12) United States Patent
Park et al.

(10) Patent No.: US 11,907,737 B2
(45) Date of Patent: Feb. 20, 2024

(54) METHOD FOR CONFIGURING HOME SCREEN AND ELECTRONIC DEVICE USING THE SAME

(71) Applicant: Samsung Electronics Co., Ltd., Suwon-si (KR)

(72) Inventors: Wonbyeong Park, Suwon-si (KR); Sangheon Kim, Suwon-si (KR); Jeonghoon Kim, Suwon-si (KR); Junyoung Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 17/521,233

(22) Filed: Nov. 8, 2021

(65) Prior Publication Data

US 2022/0058038 A1    Feb. 24, 2022

Related U.S. Application Data

(63) Continuation of application No. PCT/KR2021/009768, filed on Jul. 28, 2021.

(30) Foreign Application Priority Data

Jul. 28, 2020   (KR) .......................... 10-2020-0093449

(51) Int. Cl.
*G06F 9/451*  (2018.01)
*G06F 3/0354*  (2013.01)
(Continued)

(52) U.S. Cl.
CPC .............. *G06F 9/451* (2018.02); *G06F 3/038* (2013.01); *G06F 3/03545* (2013.01); *G06F 3/0488* (2013.01); *G06F 3/04842* (2013.01)

(58) Field of Classification Search
CPC .... G06F 3/03545; G06F 3/038; G06F 3/0383; G06F 3/04817; G06F 3/04842;
(Continued)

(56) References Cited

U.S. PATENT DOCUMENTS 8,576,181 B2 *  11/2013  Cho ..................... G06F 3/04883
                                                                345/173
8,843,838 B2 *   9/2014  Hackborn ................ G09G 5/14
                                                                715/764

(Continued)

FOREIGN PATENT DOCUMENTS

CN        109388472 A      2/2019
JP          6360170 B2     6/2018
(Continued)

*Primary Examiner* — Vijay Shankar
(74) *Attorney, Agent, or Firm* — Jefferson IP Law, LLP

(57) ABSTRACT

An electronic device according to various embodiments of the disclosure may includes a display and a processor, wherein the processor is configured to identify a first object and first data for content constituting the first object, receive an input for selecting a second object, generate a third object by synthesizing the second object based on the first object, display, on the display, third data for the generated third object and content constituting the third object, execute the second object on the displayed third object in case of detecting an occurrence of a predetermined event, and map a control of second data for content constituting the executed second object onto the third object and the third data.

15 Claims, 21 Drawing Sheets

(51) Int. Cl.
  *G06F 3/048*     (2013.01)
  *G06F 3/038*     (2013.01)
  *G06F 3/0488*    (2022.01)
  *G06F 3/04842*   (2022.01)

(58) Field of Classification Search
  CPC .. G06F 3/0488; G06F 3/0482; G06F 3/04845; G06F 3/0487; G06F 3/04883; G06F 9/451; G06F 1/1641; G06T 15/205
  See application file for complete search history.

(56) References Cited

U.S. PATENT DOCUMENTS

| | | | |
|---|---|---|---|
| 2010/0192224 A1* | 7/2010 | Ferri | G06F 21/53 |
| | | | 726/23 |
| 2011/0119610 A1 | 5/2011 | Hackborn et al. | |
| 2012/0023425 A1* | 1/2012 | Hackborn | G06F 3/0488 |
| | | | 715/764 |
| 2014/0351728 A1 | 11/2014 | Seo et al. | |
| 2015/0026615 A1 | 1/2015 | Choi et al. | |
| 2015/0029206 A1 | 1/2015 | Bialota | |
| 2015/0033160 A1 | 1/2015 | Xie et al. | |

FOREIGN PATENT DOCUMENTS

| | | |
|---|---|---|
| KR | 10-0716841 B1 | 5/2007 |
| KR | 10-0855378 B1 | 8/2008 |
| KR | 10-2012-0104242 A | 9/2012 |
| KR | 10-2014-0139377 A | 12/2014 |
| KR | 10-2015-0011577 A | 2/2015 |
| KR | 10-2015-0034828 A | 4/2015 |
| KR | 10-2015-0055959 A | 5/2015 |

* cited by examiner $$W_1 = \sqrt{\frac{R^2(H_0^2 + W_0^2)}{W_0^2}} \quad \sim 850$$

$$H_1 = \sqrt{4R^2 - \frac{R^2(H_0^2 + W_0^2)}{W_0^2}} \quad \sim 860$$

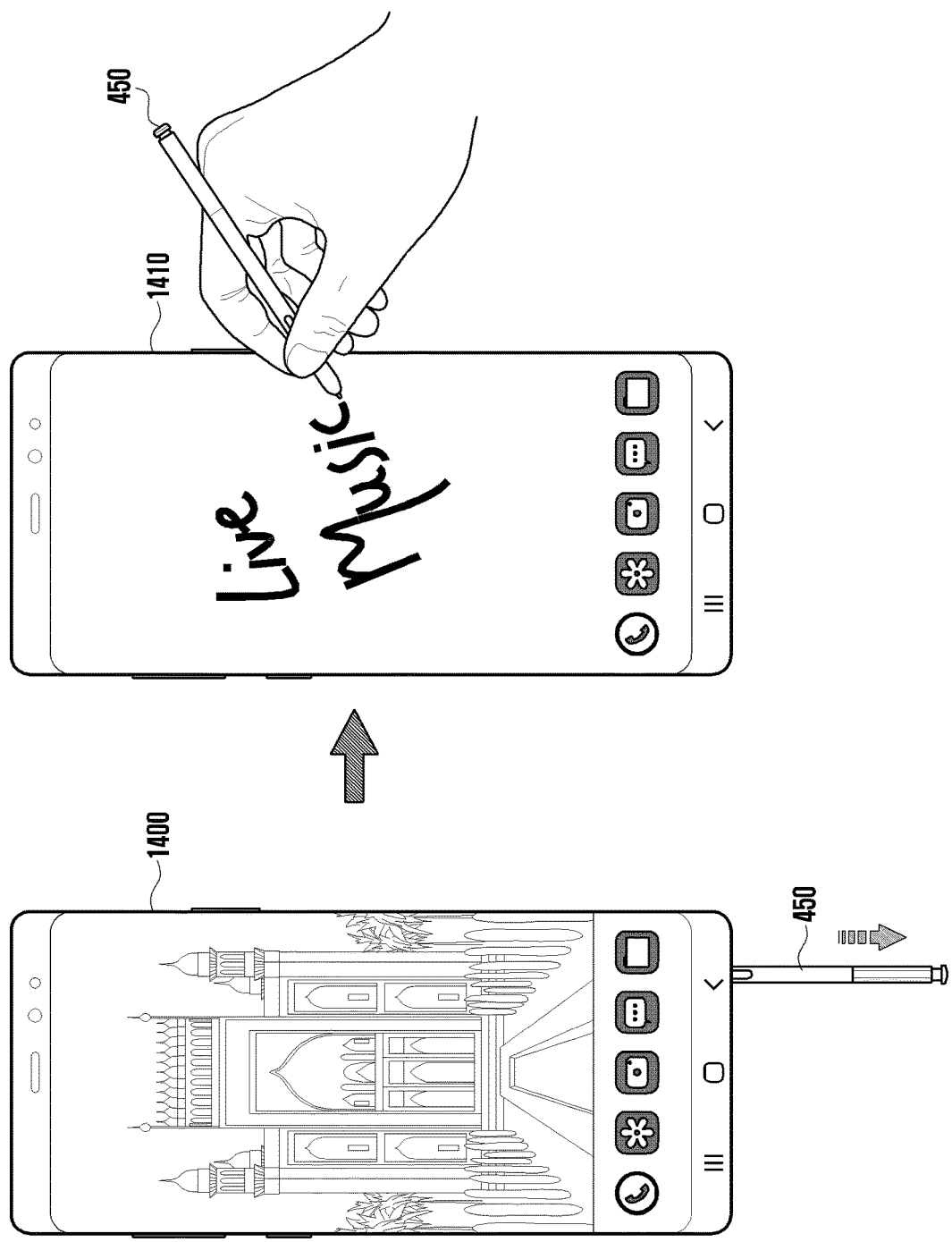

METHOD FOR CONFIGURING HOME SCREEN AND ELECTRONIC DEVICE USING THE SAME

CROSS-REFERENCE TO RELATED APPLICATION(S)

This application is a continuation application, claiming priority under § 365(c), of an International application No. PCT/KR2021/009768, filed on Jul. 28, 2021, which is based on and claims the benefit of a Korean patent application number 10-2020-0093449, filed on Jul. 28, 2020, in the Korean Intellectual Property Office, the disclosure of which is incorporated by reference herein in its entirety.

TECHNICAL FIELD

The disclosure relates to a method for configuring a home screen and an electronic device using the method.

BACKGROUND ART

A user's real-time location information of an electronic device (e.g., a smart phone) may be collected through global navigation satellite system (GNSS) information in accordance with a moving location. In particular, according to consent to personal information collection of an application installed in the electronic device, a real-time location of a user of the electronic device may be reflected and displayed on the application.

Information being displayed on the electronic device in real time may include a location, weather information in the real-time location, or time in the real-time location. With the development of the performance of the electronic device, a screen display, such as wallpaper, having an animation effect in response to a touch input may be implemented on a home screen.

As described above, in the screen display of an application that can be implemented on the home screen of the electronic device, an input through an external device (e.g., a stylus pen) may also be made. A display of the electronic device may display screens in response to various kinds of inputs, such as a user's direct input and an indirect input through the external device.

DISCLOSURE

Technical Problem

A home screen (e.g., background screen) of an electronic device may be variously configured in accordance with a preference of a user of the electronic device. For example, the home screen and a weather widget may be displayed to overlap each other.

In executing another object (e.g., an application or screen of another layer) being displayed to overlap the home screen, an indirect input through an external device (e.g., a stylus pen) may be added in addition to user's direct touch input. In case that two inputs are configured in conflict with each other on a background screen of the electronic device, an interaction of the inputs through the external device may not be performed on the electronic device.

Technical Solution

In accordance with an aspect of the disclosure, an electronic device is provided. The electronic device includes a display, and a processor, wherein the processor is configured to identify a first object and first data for content constituting the first object, receive an input for selecting a second object, generate a third object by synthesizing the second object based on the first object, display, on the display, third data for the generated third object and content constituting the third object, execute the second object on the displayed third object in case of detecting an occurrence of a predetermined event, and map a control of second data for content constituting the executed second object onto the third object and the third data.

In accordance with another aspect of the disclosure, a method for configuring a background screen of an electronic device is provided. The method includes identifying a first object and first data for content constituting the first object, receiving an input for selecting a second object, generating a third object by synthesizing the second object based on the first object, displaying, on a display, third data for the generated third object and content constituting the third object, executing the second object on the displayed third object in case of detecting an occurrence of a predetermined event, and mapping a control of second data for content constituting the executed second object onto the third object and the third data.

Advantageous Effects

An input of an external device that is communication-connected with an electronic device and is available may be utilized for execution of a specific object. In executing the object that can be utilized on a home screen, a user can prevent an interaction from conflicting with an input onto the home screen through the external device by preconfiguring an event related to the external device.

According to the various embodiments of the disclosure, an object on which a different effect is displayed corresponding to a touch input such as live wallpaper can provide an experience to execute another object on a home screen through a control through a stylus pen.

BRIEF DESCRIPTION OF THE DRAWINGS

FIG. 14 is a diagram of an interaction for a predetermined event in a method for configuring a background screen according to an embodiment of the disclosure.

MODE FOR THE DISCLOSURE

Figure 1:
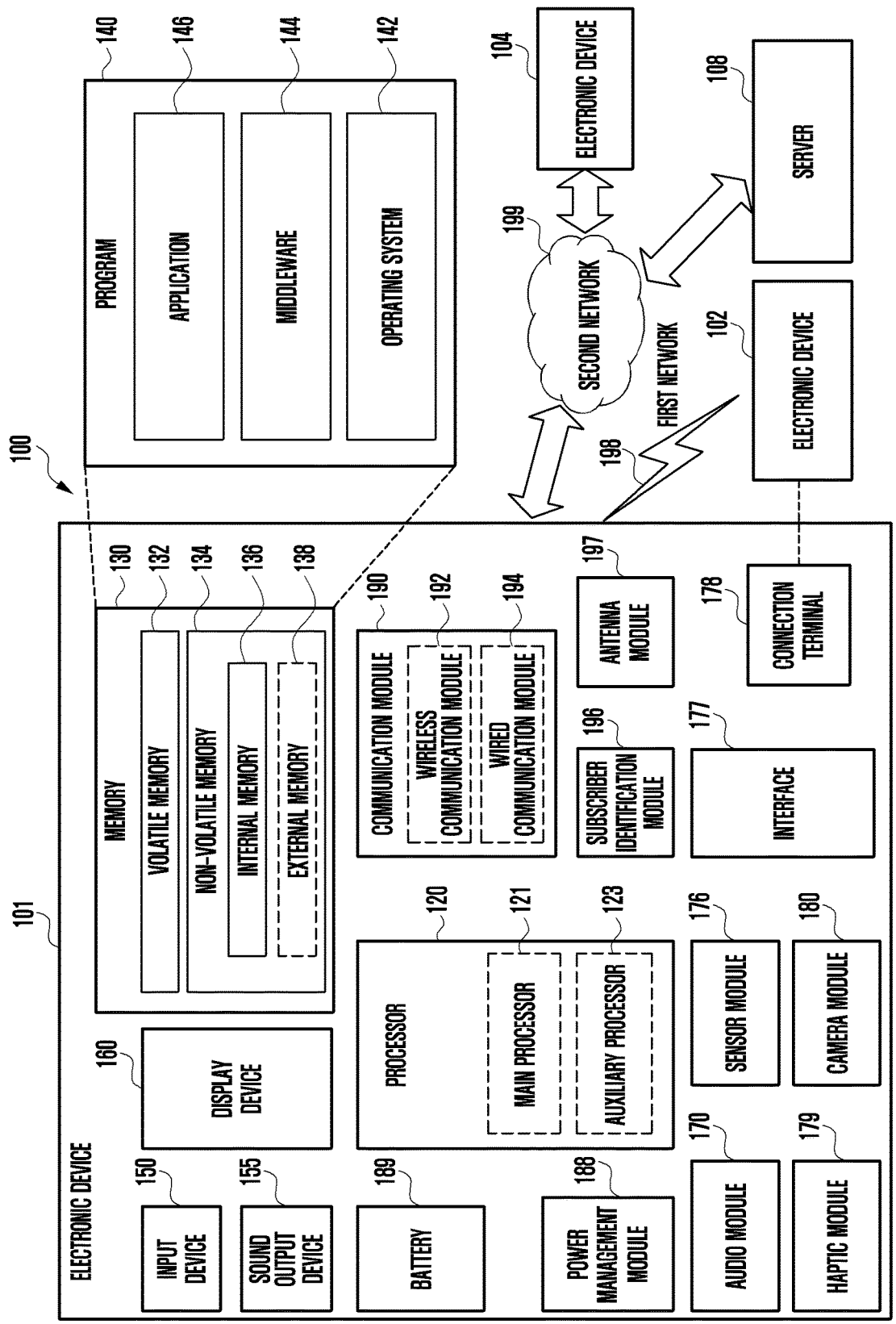
FIG. 1 is a block diagram of an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module (or device) 150, a sound output module (or device) 155, a display module (or device) 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
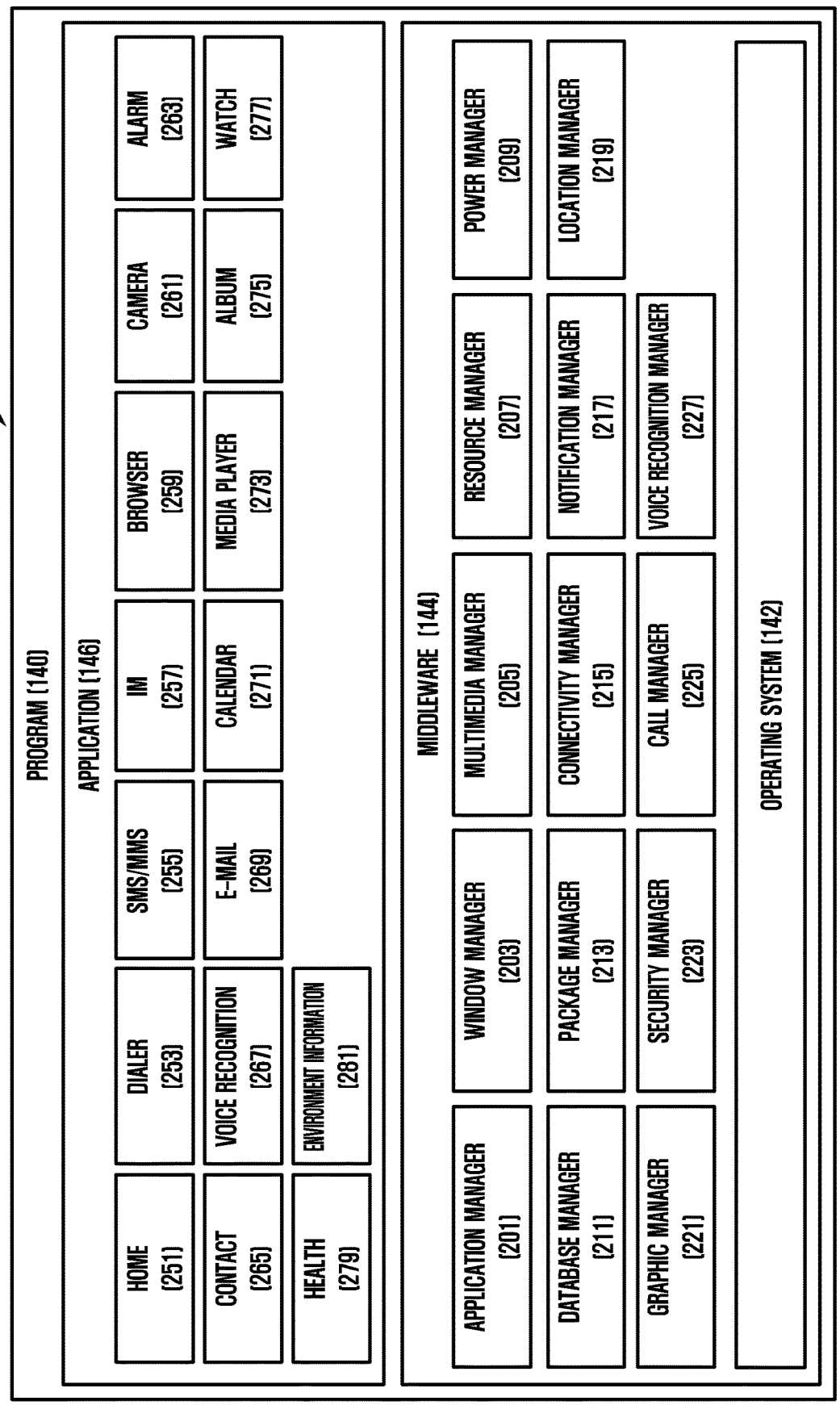
FIG. 2 is a block diagram exemplifying a program according to an embodiment of the disclosure.

FIG. 2 is a block diagram 200 illustrating the program 140 according to an embodiment of the disclosure. Referring to FIG. 2, according to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony (or call) manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant messenger (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environment information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
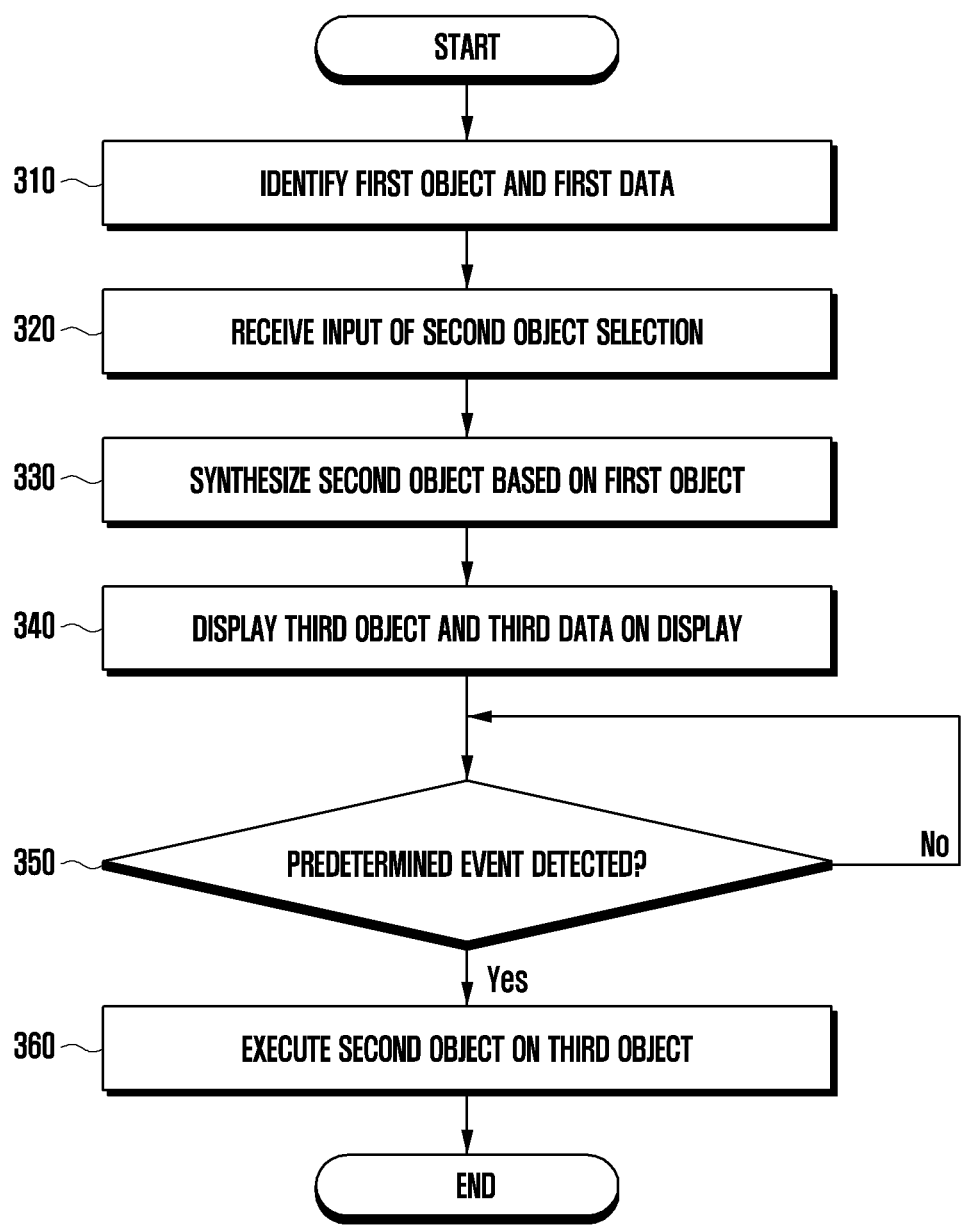
FIG. 3 is an operational flowchart of a method for configuring a background screen according to an embodiment of the disclosure.

FIG. 3 is an operational flowchart of a method for configuring a background screen according to an embodiment of the disclosure.

Referring to FIG. 3, at operation 310, a processor of an electronic device (e.g., electronic device 101 of FIG. 1) may identify a first object and first data on the first object. Here, the first object may be an initial home screen of the electronic device, and may correspond to a screen including a plurality of layers. For example, the home screen of the electronic device may be in a page form, and may be composed of three sheets of layers being switched by right and left scrolls. In this case, the first object may include three sheets of layers of the home screen and data (e.g., first data) of each layer. The data of each layer is data about an application being displayed on each layer, and may include coordinates and attributes of widgets and icons (e.g., application name, application type, package information, and icon color).

Referring to FIG. 3, at operation 320, the processor of the electronic device may receive an input for selecting a second object. For example, in case of synthesis through adding of the second object based on the first object for the home screen, the operation 320 may be an operation for receiving the input for selecting the second object using an editing application for the synthesis. Here, the editing application may be an application that generates a third object by synthesizing the first object and the second object with each other. For example, the editing application may be provided through installation by a manufacturer when the electronic device is initially provided, or may be provided in a downloadable form through updating through a communication module.

Referring to FIG. 3, at operation 330, the processor of the electronic device may synthesize the second object based on the first object. For example, in case that the first object is the home screen, and the second object is a live wallpaper screen, the live wallpaper may be synthesized based on the home screen. Here, second data of the second object may also be synthesized with the first data based on the first object.

According to various embodiments, the live wallpaper may be implemented by a method capable of representing an animation effect through application of a touch event or a method using parallax. The method using the parallax that is the latter may use the fact that in case of observing the same object at different angles, apparent locations of the object being formed on a fixed background become different from each other.

According to various embodiments, in case of executing the second object (e.g., live wallpaper) on the first object (e.g., home screen), a direct input (e.g., touch input on the electronic device) and an indirect input (e.g., input through the stylus pen) may conflict with each other. According to an embodiment, the direct input may include an input using a touch panel included in the electronic device using a user's body or tool (e.g., a stylus pen) and an input using an induced magnetic field signal formed between the stylus pen and an electromagnetic induction panel. According to an embodiment, the indirect input may include an input through a stylus pen connected to communicate with the electronic device (e.g., short-range communication or long-range communication) or an external electronic device. In case of executing the live wallpaper utilizing the touch on the home screen, different from the live wallpaper utilizing the parallax, the inputs for the first object and the second object may conflict with each other, or the direct input and the indirect input may conflict with each other.

According to various embodiments of the disclosure, the event conflict occurring due to the direct input or the indirect input may not exist. For example, it may be configured to change an interaction so that the second object (e.g., the live wallpaper) can be executed on the third object by mapping the input (e.g., an event through the stylus pen) onto a control of the second object. A user can perform customizing so as to change matters related to the input that can be utilized on the third object.

Referring to FIG. 3, at operation 340, the processor of the electronic device may display, on a display, the third object generated by synthesizing the second object based on the first object and third data. For example, the third object may include the first object and the second object, and may correspond to the result of synthesizing a large number of objects without being restricted by figures included in the title. Further, the third data may include the first data and the second data, and may correspond to the result of synthesizing a larger number of data without being restricted by figures included in the title. According to an embodiment, the third data may mean data being displayed on the third object. For example, the third data may be configured so that when a predetermined event occurs in a state where the first data is displayed on the third object, the second data is displayed.

Referring to FIG. 3, at operation 350, the processor of the electronic device may detect the occurrence of the predetermined event. According to an embodiment, if the predetermined event is not detected, it may be configured to display only the first data among the third data on the third object. According to another embodiment, if the predetermined event is detected, it may be configured to display the third data on the third object at operation 360. Here, when the third data is displayed, the second data may be displayed together through the execution of the second object.

Figure 4:
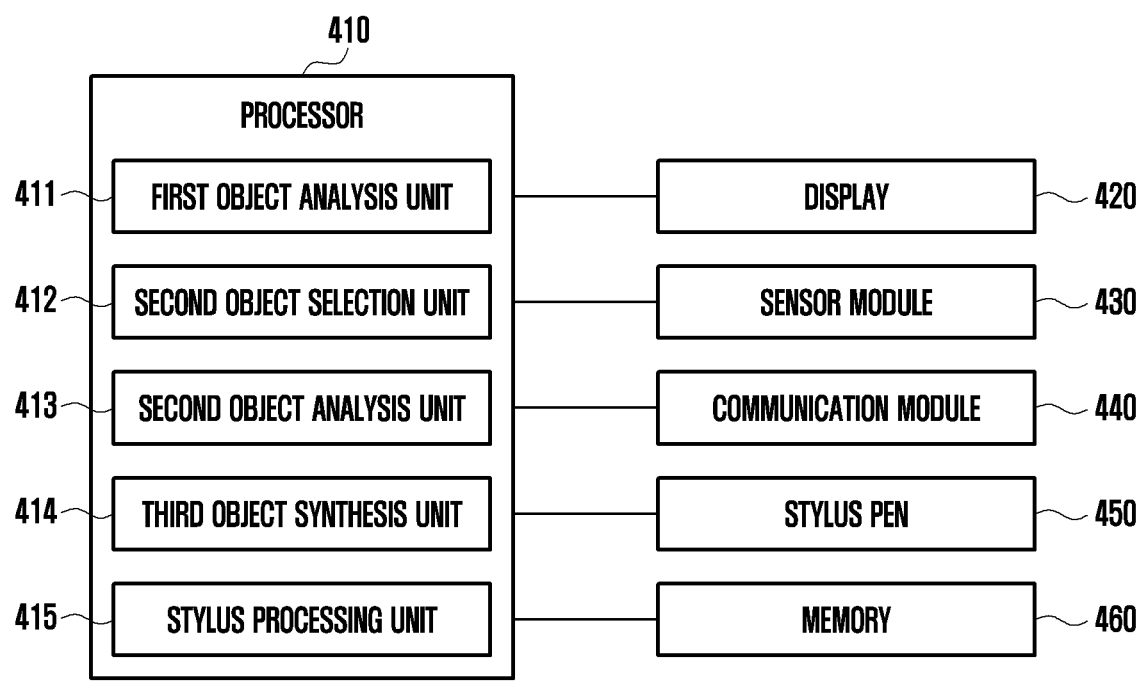
FIG. 4 is a block diagram of internal constituent elements of an electronic device according to an embodiment of the disclosure.

FIG. 4 is a block diagram of internal constituent elements of an electronic device according to an embodiment of the disclosure.

Referring to FIG. 4, an electronic device (e.g., electronic device 101 of FIG. 1) may include a processor 410 (e.g., processor 120 of FIG. 1), a display 420 (e.g., display module 160 of FIG. 1), a sensor module 430 (e.g., sensor module 176 of FIG. 1), a communication module 440 (e.g., communication module 190 of FIG. 1), a stylus pen 450 (e.g., input module 150 of FIG. 1), and a memory 460 (e.g., memory 130 of FIG. 1), and parts of the illustrated configurations may be omitted or replaced. The electronic device may include at least parts of the configurations and/or functions of the electronic device 101 of FIG. 1.

According to various embodiments, the processor 410 is configured to perform control of respective constituent elements of the electronic device and/or communication operation or data processing, and may include at least parts of the configurations and/or functions of the processor 120 of FIG. 1. The processor may be functionally, operatively, and/or electrically connected to the internal constituent elements of the electronic device including the display, sensor module, communication module, and stylus pen.

According to various embodiments, the processor 410 may be composed of function blocks of a first object analysis unit 411, a second object selection unit 412, a second object analysis unit 413, a third object synthesis unit 414, and a stylus processing unit 415. The function blocks may correspond to an example in which the processor 410 divides functions for individual processes for processing a method for configuring a background screen according to various embodiments of the disclosure into blocks.

According to various embodiments, the first object analysis unit 411 may exemplify processing of the processor 410 for analyzing the home screen as the function block. The second object selection unit 412 may exemplify selection of the second object as the function block in order to synthesize the third object based on the first object. The second object analysis unit 413 may exemplify analysis of the selected second object and the second data that may be included in the second object as the function block. The third object synthesis unit 414 may exemplify generation of the third object by synthesizing the second object based on the first object as the function block. The stylus processing unit 415 may exemplify the function block for processing an input of the stylus pen capable of being communication-connected to the electronic device or processing detection and/or input of a predetermined event.

According to various embodiments, the display 420 may be called a flat display and/or flexible display of the electronic device. According to an embodiment, the display may be a primary display or a secondary display of the electronic device, and may include at least one display. The display according to various embodiments of the disclosure may include at least parts of the configurations and/or functions of the display module 160 of FIG. 1. According to an embodiment, the display 420 may include a touch sensor configured to detect a touch or a pressure sensor configured to measure the strength of a force generated by the touch. According to an embodiment, the display 420 may include an electromagnetic induction panel communicable with the stylus pen 450 in an electromagnetic method. According to an embodiment, the electromagnetic induction panel may be disposed between the display and the rear side of the electronic device separately from the display. According to an embodiment, the electronic device may identify the location of the stylus pen 450 based on the level of an induced electromotive force (e.g., output current) being generated by an input signal of an electromagnetic resonance type. According to various embodiments, the display 420 may display a background screen (e.g., dynamic wallpaper) synthesized or generated under the control of the processor 410. According to an embodiment, the display 420 may display a configuration screen for configuring the background screen.

According to various embodiments, the sensor module 430 may include at least parts of the configurations and/or functions of the sensor module 176 of FIG. 1. The sensor module may include a sensor capable of detecting a folding state of the electronic device (e.g., folding state of the display). The sensor module may be equal to or similar to a sensor or a sensor module that may be included in the stylus pen. For example, in case of using the communication-connectable stylus pen, the sensor module of the electronic device may be configured to control content of the electronic device using the sensor module of the stylus pen on behalf of the sensor module of the electronic device. According to another embodiment, in case of not using the communication-connectable stylus pen, the sensor module of the electronic device may be configured to control the content of the electronic device using the sensor module of the electronic device.

According to various embodiments, the communication module 440 may support short-range communication connection with an external device (e.g., a stylus pen ejected from the electronic device or a stylus pen separate from the electronic device). For example, if the electronic device and the external device are located within a distance in which the short-range communication connection is possible, the communication connection between them may be possible through the communication module. The communication module according to various embodiments may include at least parts of the configurations and/or functions of the communication module 190 of FIG. 1.

According to various embodiments, the stylus pen 450 may be guided and inserted into or may be detached from an inside of a housing through the side of the housing of the electronic device, and may include a button for facilitating the detachment. According to an embodiment, the stylus pen 450 may be attached to or detached from the front, the side, or the rear of the housing of the electronic device, and may include a magnet for facilitating the detachment. The stylus pen 450 may have a separate built-in resonance circuit, and may interlock with the electromagnetic induction panel included in the electronic device. According to various embodiments, the stylus pen may be implemented in an electromagnetic resonance (EMR) type, an active electrical stylus (AES) type, or an electric coupled resonance (ECR) type. The stylus pen according to various embodiments of the disclosure may include at least parts of the configurations and/or functions of the input device 150 of FIG. 1. According to an embodiment, it has been described that the stylus pen 450 is included in the electronic device 101, but the stylus pen 450 is not limited thereto. The stylus pen 450 may be an external input device separately from the electronic device 101. The external input device (e.g., electronic device 102 of FIG. 1, wearable device, mouse, or keyboard) may be connected to the electronic device 101 using the short-range or long-range communication.

According to various embodiments, the memory 460 may store therein various pieces of data. For example, information on a "predetermined event" may also be stored in the memory, and a command to be executed by the processor may also be stored therein.

Figure 5:
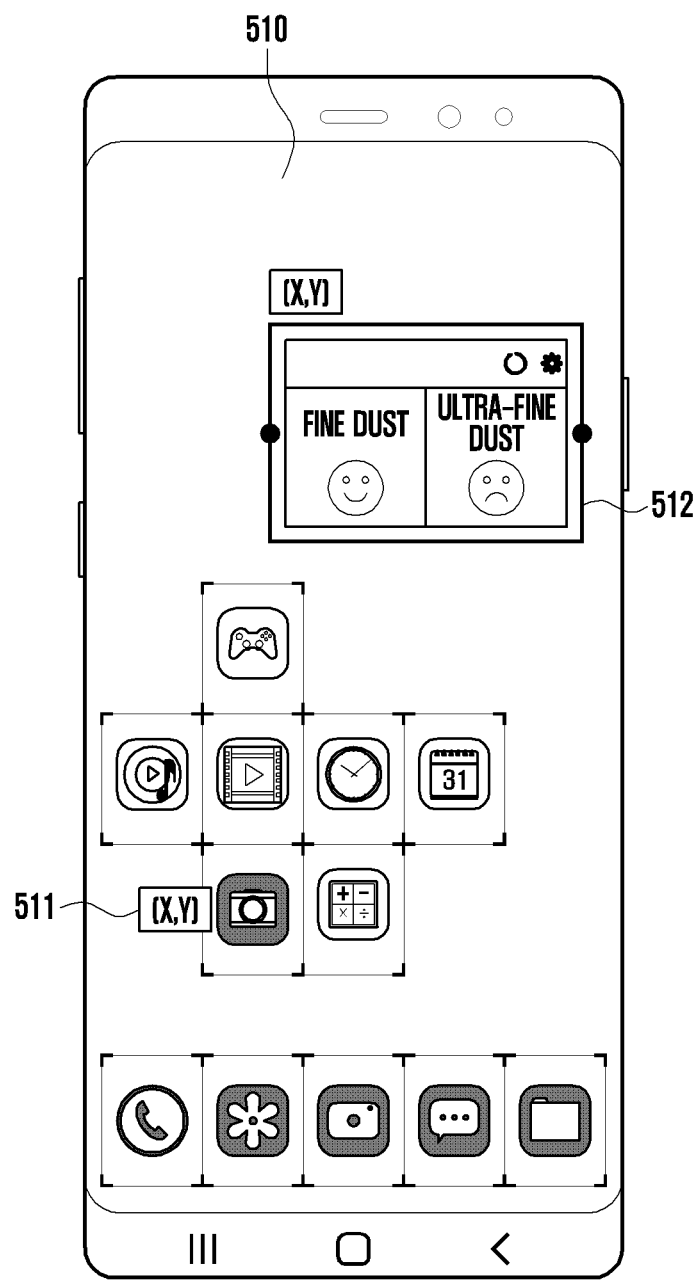
FIG. 5 is a diagram of an object and data on the object in a method for configuring a background screen according to an embodiment of the disclosure.

FIG. 5 is a diagram of an object and data on the object in a method for configuring a background screen according to an embodiment of the disclosure.

Referring to FIG. 5, configuration of the n-th page of a home screen of the electronic device may be composed of 510, 511, and 512. Here, the n-th page is named since the configuration of the home screen may be formed over a plurality of pages, and types of applications being displayed on the individual pages may differ from one another.

According to various embodiments, the first object 510 may mean the home screen. The first object may mean the home screen composed of individual layers, such as the first page, second page, and/or n-th page. Information related to an application that may be included in the first object may be called first data 511 and 512. According to an embodiment, the first data is data for the application being displayed on an individual layer, and may include coordinates of widgets and icons, and sizes or attributes of icons of the widgets and applications (e.g., application name, application type, package information, icon colors). Here, an individual layer may mean an individual page of the first object 510 as the home screen.

Referring to FIG. 5, the first data may include information related to the application of the first page (e.g., first layer) of the first object. For example, data for the application among the first data 511 may include coordinates and/or attributes of icons of the application being displayed on the first page of the first object. According to an embodiment, the data of the application among the first data may include information on the coordinates (x,y) of the icon of the application being displayed on the n-th page of the first object.

Referring to FIG. 5, the first data may include information related to the widget of the first page (e.g., first layer) of the first object. For example, among the first data, the data related to the widget 512 may include the coordinates and/or attributes of the icon of the widget being displayed on the first page of the first object. According to an embodiment, the data for the widget among the first data may include information on the coordinates (x,y) of the icon of the widget being displayed on the n-th page of the first object. According to another embodiment, the data for the widget among the first data may include information on the size (e.g., 3×2 size) of the icon of the widget being displayed on the n-th page of the first object.

According to various embodiments, the first data that can be included in the n-th page of the first object is not limited to the application and the widget. The first data may be included without being limited by the title in case that the first data is utility of icon display which is displayed on the home screen of the electronic device and of which the location is movable in the form of coordinates.

Figure 6:
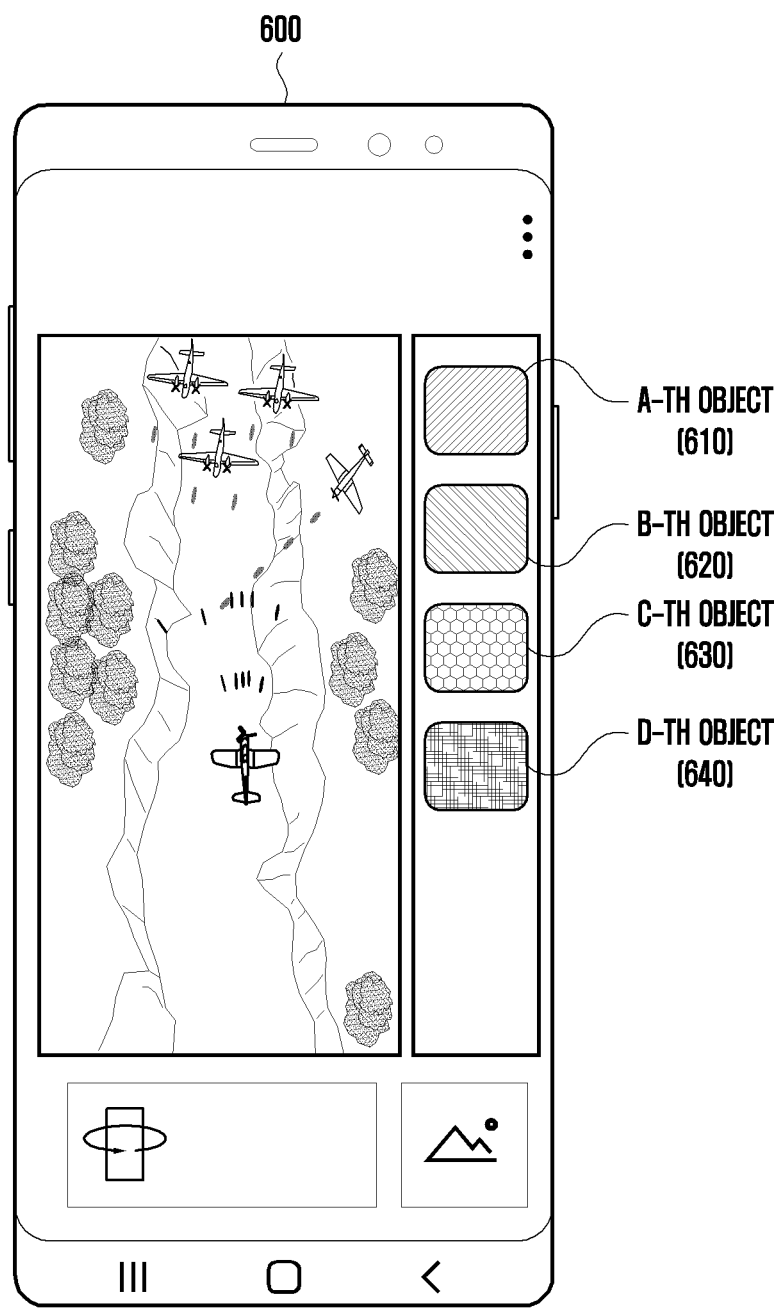
FIG. 6 is a diagram of a configuration screen for object synthesis in a method for configuring a background screen according to an embodiment of the disclosure.

FIG. 6 is a diagram of a configuration screen for object synthesis in a method for configuring a background screen according to an embodiment of the disclosure.

Referring to FIG. 6, a configuration screen of an editing application 600 for synthesis with the n-th object (e.g., third object synthesized based on the home screen) of the electronic device may be illustrated. For example, the second object (e.g., live wallpaper screen) may be selected based on the first object (e.g., home screen), and may be synthesized with the third object. In case that the screen illustrated in FIG. 6 is the configuration screen of the editing application for synthesizing the n-th object, small a-th, b-th, c-th, and d-th objects 610, 620, 630, and 640, respectively, displayed on the right side of the display of the electronic device may correspond to the second object as exemplified above. Further, the a-th to d-th objects 610 to 640 may be the contents of the second data (e.g., an application or particle) to be displayed in the selected object (e.g., an object selected among 610 to 640). For example, if a user selects the a-th object 610, it may be displayed as a list for selecting a particle (e.g., configuration to be displayed in the application, e.g., snow grain in a snowy weather) as a lower concept that can be displayed on the a-th object.

Referring to FIG. 6, if the first object is set as the home screen, the a-th to d-th objects that may be selected as the second object can be synthesized based on the first object. The synthesized object may be the n-th object (e.g., third object). Here, the object being displayed on the left side of the a-th to d-th objects 610 to 640 may correspond to a preview screen.

Referring to FIG. 6, the a-th to d-th objects 610 to 640 may include various kinds of images particle information, or stylus stroke information. For example, the a-th to d-th objects may be about the color of the object to be selected. According to an embodiment, the a-th to d-th objects may be a screen having various options, and may be synthesis of only one object based on the first object. According to another embodiment, the a-th to d-th objects may be a screen having various options, and may be synthesis of two or more objects based on the first object.

Figure 7A:
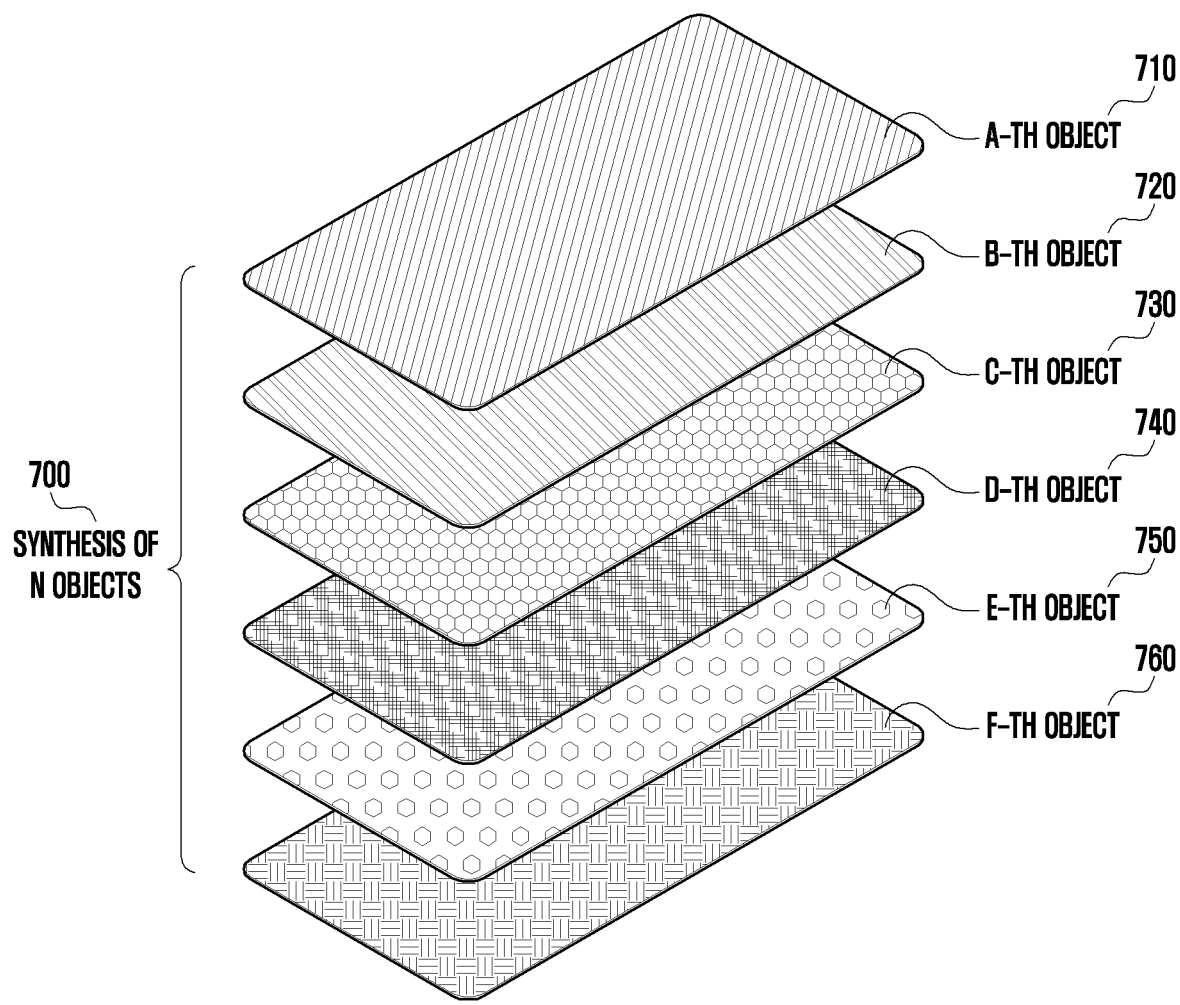
FIG. 7A is a diagram of an object synthesizing process according to an embodiment of the disclosure.
Figure 7B:
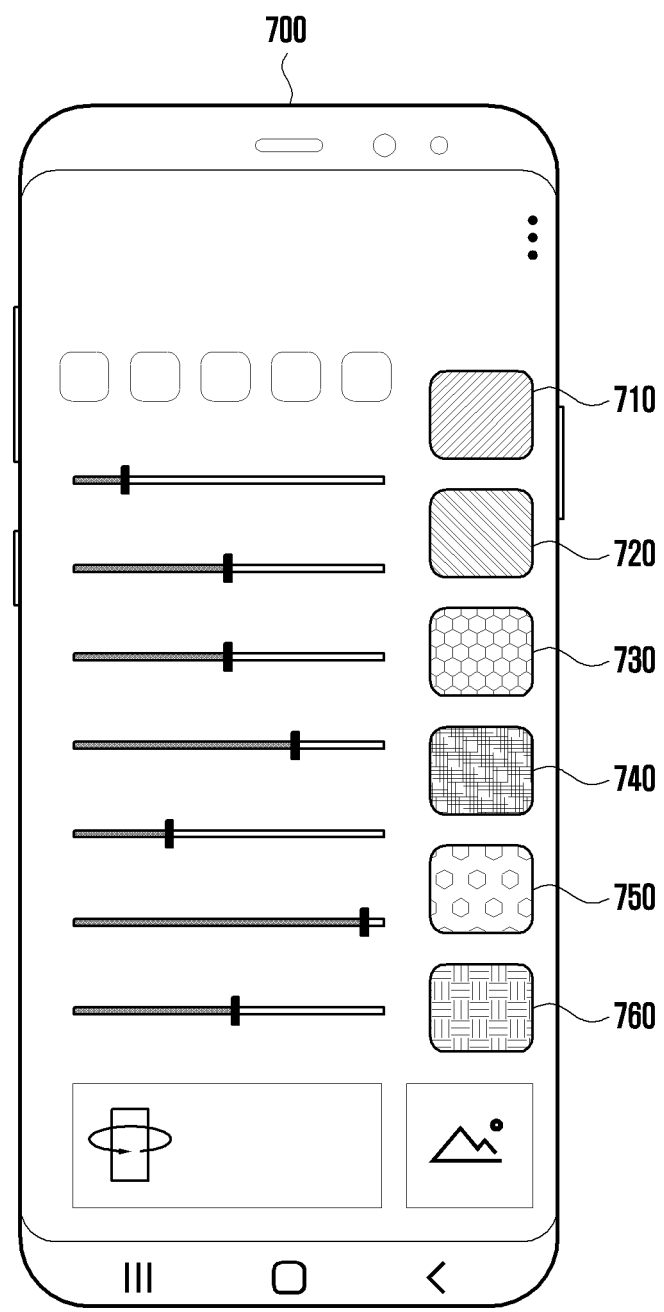
FIG. 7B is a diagram of an object synthesizing process according to an embodiment of the disclosure.

FIGS. 7A and 7B are diagrams of an object synthesizing process according to various embodiments of the disclosure.

A processor (e.g., processor 120 of FIG. 1 or processor 410 of FIG. 4) of an electronic device (e.g., electronic device 101 of FIG. 1) may perform an operation of synthesizing a second object based on a first object. For example, the processor may perform an operation of analyzing one or more selected second objects. The processor may include image processing to determine a category to which a user image belongs, image processing to separate object areas constituting the user image, image processing to analyze the object areas constituting the user image, and/or image processing to select the object areas to be used during the synthesis or image generation. Here, the processor may utilize the n-th data that can be included in the n-th object. According to an embodiment, the processor may synthesize a plurality of objects using surfaceflinger. The surfaceflinger may provide data representing a plurality of synthesized objects to a display controller. Here, the display controller may mean a graphic display controller. The display controller may prevent an overload of the processor (e.g., AP).

Referring to FIG. 7A, the a-th, b-th, c-th, d-th, e-th, and f-th objects 710, 720, 730, 740, 750, and 760, respectively, may be synthesized 700 by 3D vertical floating. For example, the second object including the a-th to f-th objects may be synthesized by a dynamic wallpaper control manager (DWCM). According to an embodiment, the DWCM may be a module in charge of image synthesis or stylus pen interaction.

According to various embodiments, the processor may analyze the first object and the second object constituting the n-th object (e.g., third object obtained by synthesizing at least one second object based on the first object). Here, the analysis process may correspond to one of synthesizing processes. Referring to FIG. 7A, the processor may analyze the a-th to f-th objects 710 to 760 that may correspond to the second object. For example, the a-th object may correspond to particle content (e.g., snow grain in a snowy weather), the b-th object may correspond to the image content, and the c-th object may correspond to notification content. The processor may synthesize and/or analyze the objects from the n-th object. Further, the order of selection and/or synthesis of the a-th to f-th objects may be changed.

According to various embodiments, a user may change the configuration of the second object in a process of synthesizing the third object. Referring to FIG. 7B, the second object may correspond to the a-th to f-th objects 710 to 760. This may correspond to configuration of individual data of individual objects of the second object 710 to 760.

Referring to FIG. 7B, when the a-th to f-th objects 710 to 760 perform texture mapping of particles, it may be configured to apply a polygon vertices algorithm. For example, an animation moving corresponding an input of the stylus pen may be displayed as the a-th to f-th objects 710 to 760, and may be editable. Further, the particles that the individual objects (e.g., a-th to f-th objects 710 to 760) can change and/or adjust as details may include various pieces of attribute information. For example, as the details, duration, rotation, transition X, Y, and matters on the total amount of particle or start and end area of the particle may exist.

Figure 8A:
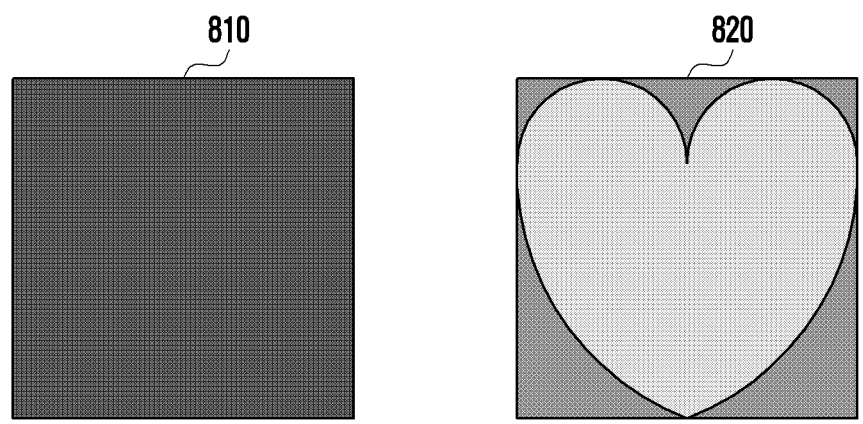
FIG. 8A is a diagram of a data scaling process in object synthesis according to an embodiment of the disclosure.
Figure 8B:
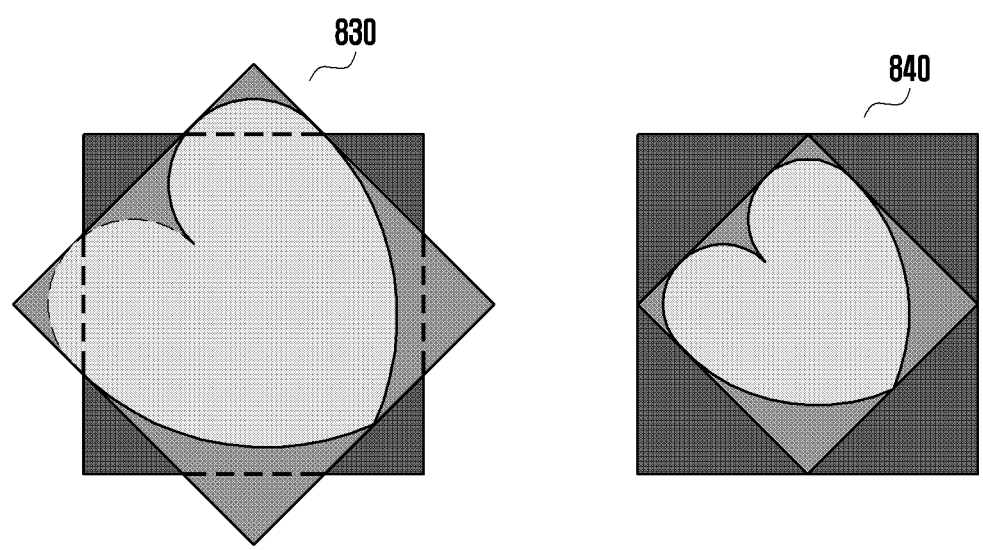
FIG. 8B is a diagram of a data scaling process in object synthesis according to an embodiment of the disclosure.
Figure 8C:
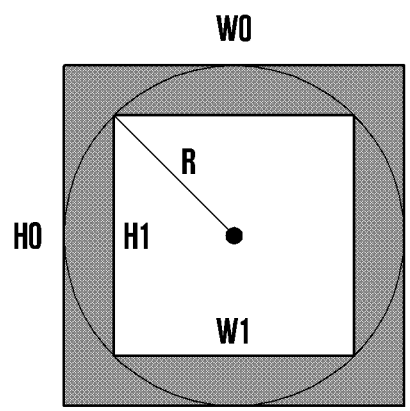
FIG. 8C is a diagram of a data scaling process in object synthesis according to an embodiment of the disclosure.

FIGS. 8A to 8C are diagrams of a data scaling process in object synthesis according to various embodiments of the disclosure.

Referring to FIG. 8A, synthesis of particles may be performed in consideration of rotation of the particles having the same size. For example, the size of the particle that may be located at constant coordinates may be defined as 810. The display area of the particle that may be expressed as a dot may correspond to the display area in which movement (e.g., rotation) of another texture (e.g., 820 of FIG. 8A) may be reflected.

Referring to FIGS. 8A to 8C, in case that the particle is the dot 810, an embedded-system graphics library (EGL) may be used. Here, the EGL may correspond to a kind of specification according to an open graphics library (OpenGL). The open graphics library is 2D and 3D graphics standard API specification, and may support cross-application programming between platforms between programming languages. For example, the EGL is a kind of OGL, and may be the programming that can be performed within a control limit of a graphics processing unit (GPU) of an electronic device (e.g., a smart phone). If rotation of the particle is applied by the EGL, rotation of the dot (810) particle may not be applied. For example, although the rotation of the texture (820) particle should be displayed within the display area of the dot (810) particle, they occupy the same display area, and thus a partial area of the texture 820 may be cut out from being displayed.

Referring to FIG. 8B, an example 830 can be identified, in which as a part (e.g., corner area) of the texture 820 moves out of the display area of the dot 810 due to the rotation of the texture 820, the partial area of the texture is cut out from being displayed. According to an embodiment, the partial area (e.g., corner area that deviates from the display area of the dot 810 through the rotation) of the texture 820 does not have mapping coordinates, and thus it may be cut out and may not be displayed in case of performing the EGL. According to another embodiment, the processor may perform scaling so that the texture 820 to be rotated and displayed is mapped onto the display area of the dot 810 as a whole. For example, the processor may perform scaling so that the deviating corner area can be located within the display area of the dot 810 through rotation of the texture 820. The processor may be configured to scale the texture 820 (840) with a size enough to be entered into a circle inscribed in the square dot 810. Here, the processor is a central processing unit (CPU), and may be an AP or may control a GPU through the AP.

Referring to FIG. 8C, the border of the largest outer square may mean the display area of the dot (810) particle. According to an embodiment, the processor may identify the side length of the dot 810 as a predetermined value. For example, the processor may identify lengths of W0, H0, and R. The processor may calculate the side lengths W1 and H1 of the texture 820 with a size enough to be entered into the circle inscribed in the dot 810. In this case, the processor may calculate the side lengths W1 and H1 through equations 850 and 860 as arithmetic expressions.

Figure 9:
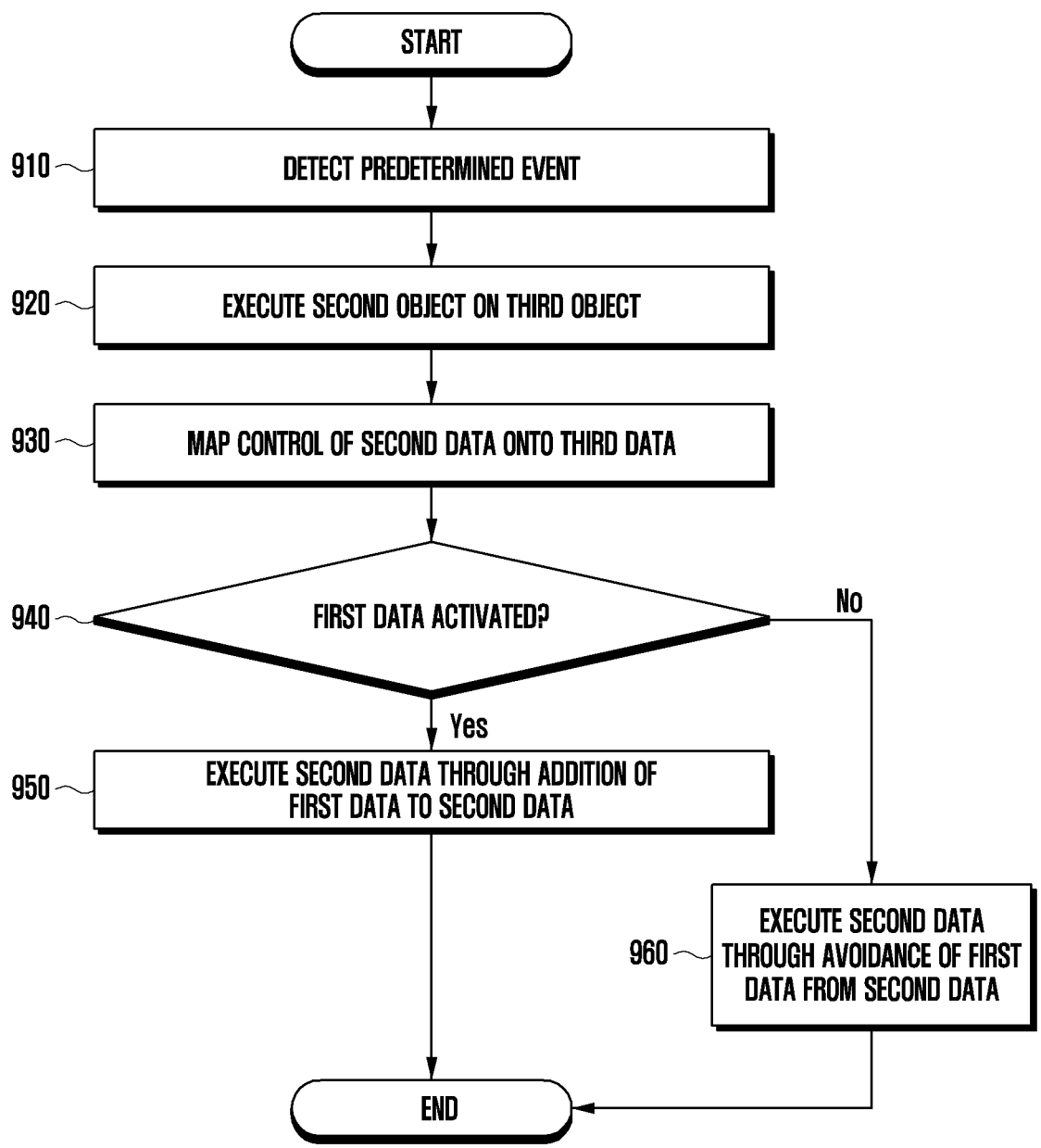
FIG. 9 is an operational flowchart of mapping onto a synthesized object and data processing in a method for configuring a background screen according to an embodiment of the disclosure.

FIG. 9 is an operational flowchart of mapping onto a synthesized object and data processing in a method for configuring a background screen according to an embodiment of the disclosure.

Referring to FIG. 9, a processor, at operation 910, may detect whether a predetermined event has occurred. According to an embodiment, the predetermined event may correspond to detection of an ejection (e.g., ejection or detach) of a stylus pen that may be built in an electronic device. According to another embodiment, the predetermined event may correspond to detection of a communication connection between the electronic device and the stylus pen. Here, the stylus pen being communication-connected with the electronic device may be a pen built in the electronic device, or may be a pen that is not built in the electronic device as an external device. According to another embodiment, the predetermined event may correspond to detection of a state change of the electronic device. For example, the predetermined event may correspond to detection of folding or bending of a flexible display.

Referring to FIG. 9, the processor, at operation 920, may be configured to execute a second object on a third object. For example, the processor may be configured to execute second data of the second object constituting the synthesized third object. Execution of the second object on the third object may be display of a screen of the second object (e.g., a live wallpaper screen) to overlap a home screen that is a main screen of the third object.

Referring to FIG. 9, the processor, at operation 930, may be configured to map a control of the second data onto third data. For example, the processor may be configured to display the third data on the third object and to map an input of first data and second data constituting third data. The third data may be displayed on the third object in a manner that only the first data is displayed on the main home screen unless the predetermined event is detected, and if the predetermined event is detected, the second data is displayed together with the first data. The processor may be configured to map the second data onto the third data by displaying dynamic movement of the second data to overlap the first data.

Referring to FIG. 9, the processor, at operation 940, may determine whether to activate the first data. According to an embodiment, the processor may be configured to display the first data separately from the second data (e.g., first data inactivated) among the third data being displayed on the third object. According to another embodiment, the processor may be configured to display the first data and the second data together (e.g., first data activated) among the third data being displayed on the third object.

Referring to FIG. 9, based on the determination at operation 940, the processor may be configured to execute a next operation depending on activation or inactivation of the first data on the third object. According to an embodiment, if it is determined that the first data is activated, the processor, at operation 950, may be configured to add the first data to the second data to be executed. In this case, the processor may be configured to activate and execute both the first data and the second data among the third data. According to another embodiment, if it is determined that the first data is inactivated, the processor, at operation 960, may be configured to avoid the first data from the second data. In executing the second data, the first data may serve as an obstacle. In this case, the processor may display an icon of the first data blurry so that the first data does not serve as an obstacle in executing the second data by inactivating the icon of the first data among the third data.

Figure 10A:
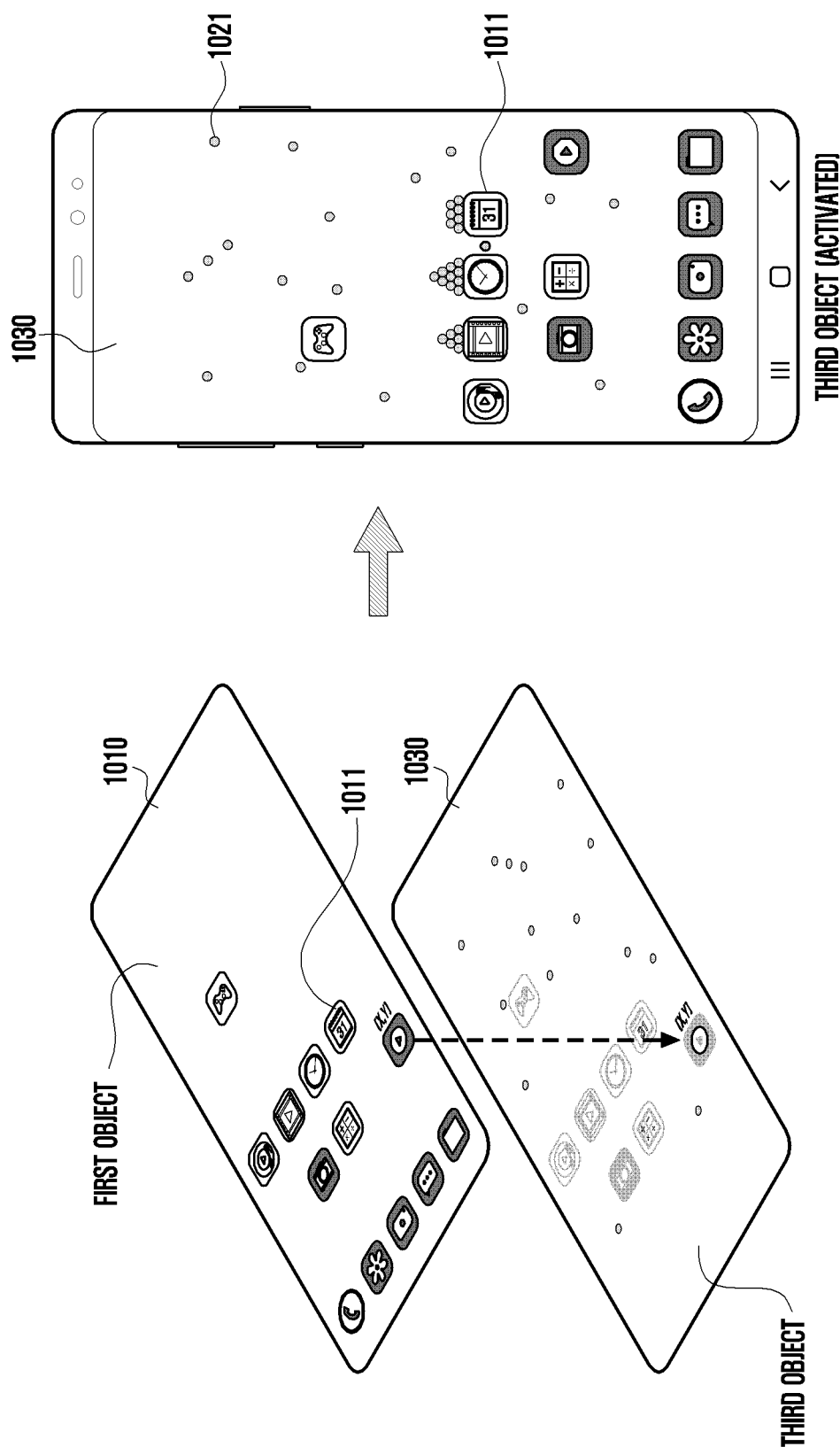
FIG. 10A is a diagram related to an object and data configuration in a method for configuring a background screen according to an embodiment of the disclosure.
Figure 10B:
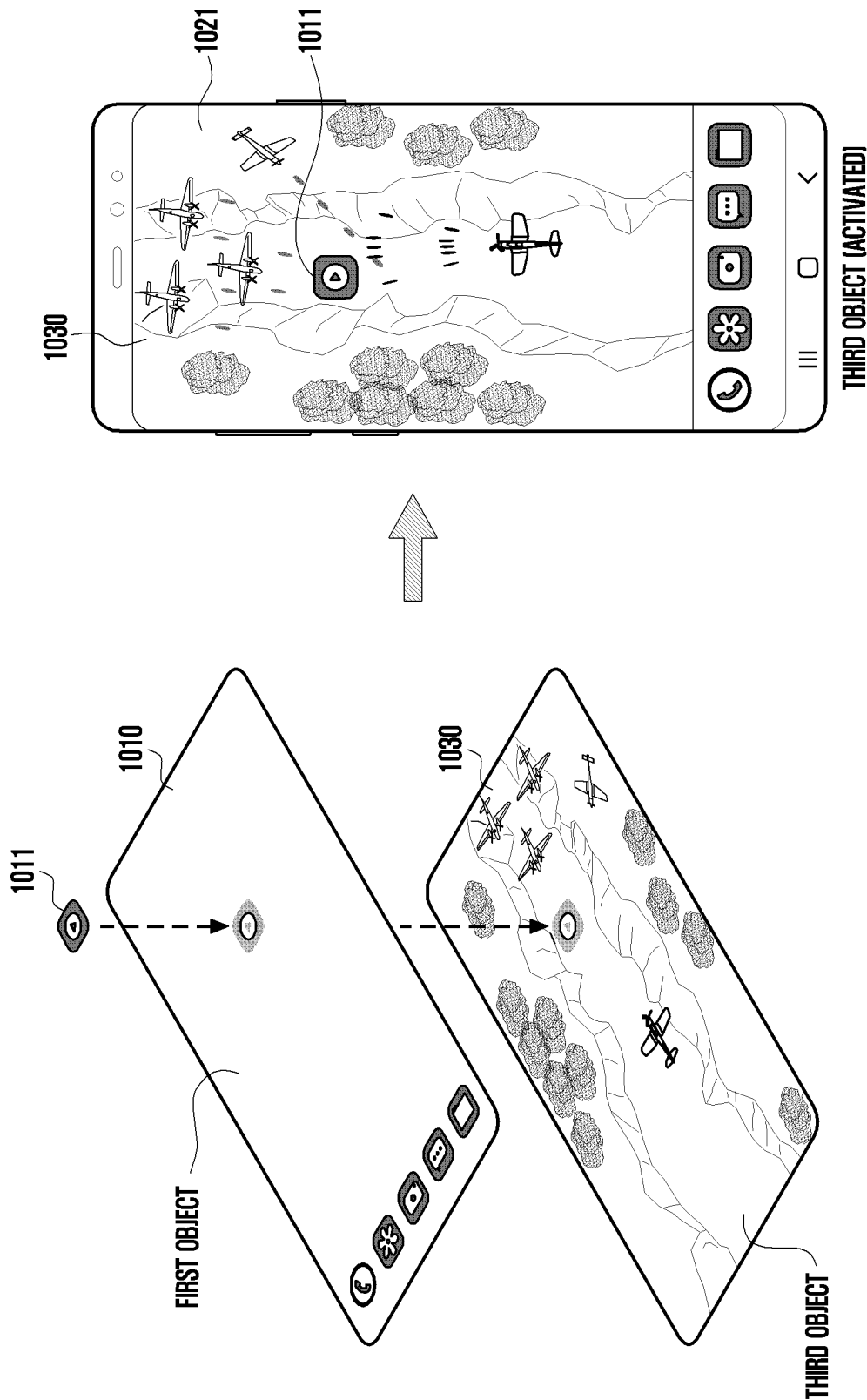
FIG. 10B is a diagram related to an object and data configuration in a method for configuring a background screen according to an embodiment of the disclosure.
Figure 10C:
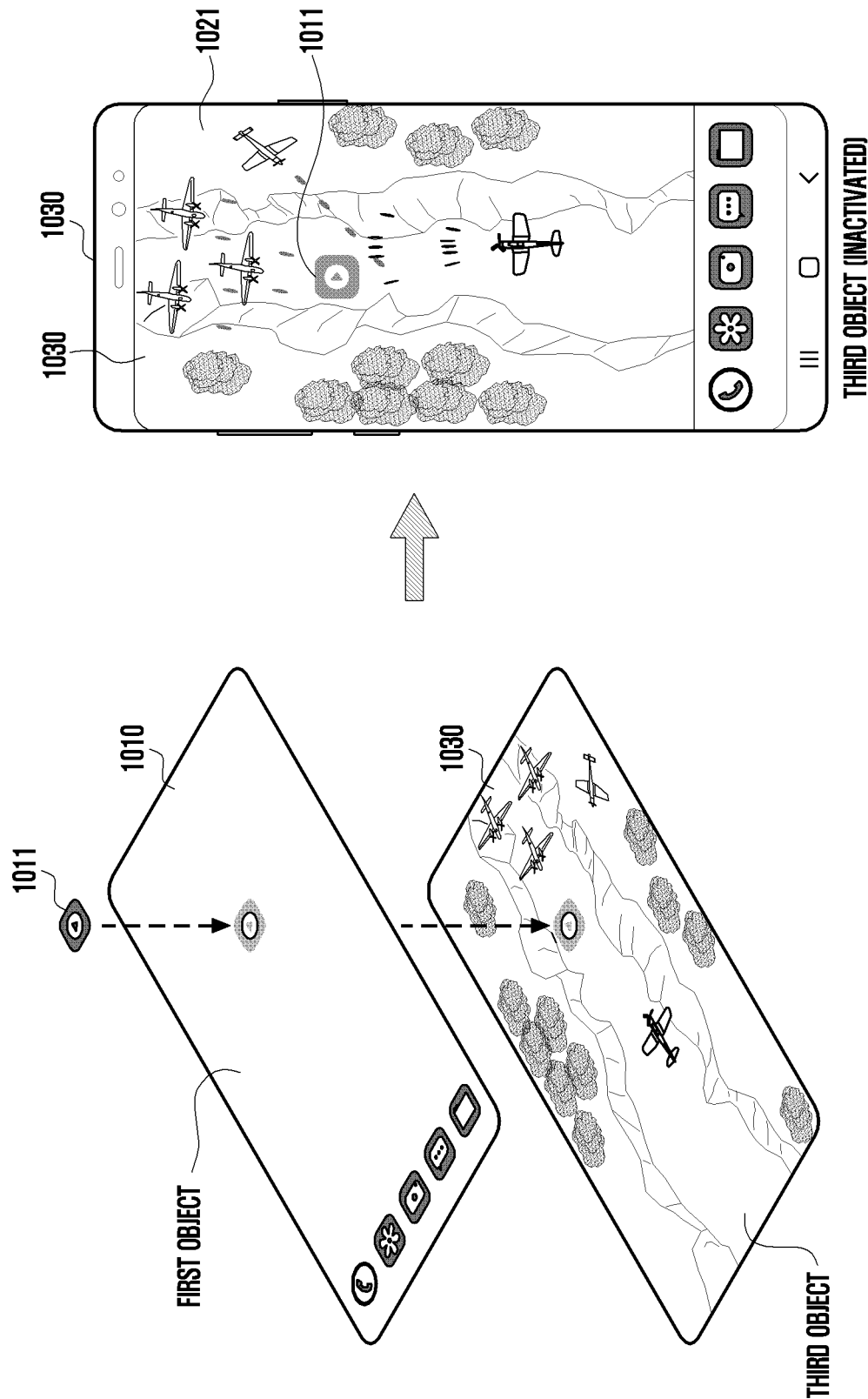
FIG. 10C is a diagram related to an object and data configuration in a method for configuring a background screen according to an embodiment of the disclosure.

FIGS. 10A to 10C are diagrams related to an object and data configuration in a method for configuring a background screen according to various embodiments of the disclosure.

Referring to FIG. 10A, a first object 1010 may correspond to a home screen, and may include first data 1011. A third object 1030 may be generated by synthesizing a second object selected based on a first object 1010. For example, the second object may correspond to a live wallpaper screen, and specific second data may be determined depending on the weather reflecting a user's location. If the weather reflecting the user's location is "snowy," the second data may correspond to display of "snowy" as a particle. According to an embodiment, the third data may include the first data and the second data. It may be configured that the third data is displayed in consideration of the first data as a basic component of the home screen, and the second data is displayed only in case that the predetermined event is detected. According to another embodiment, the third data may be configured to display the first data and the second data together on the third object. If it is determined that the first data is activated on the third object, the processor may display the second data 1021 so that the first data 1011 is recognized as an obstacle. Referring to FIG. 10A, the processor may display the second data 1021 expressing the snowy weather on the third object 1030 so as to pile up on the icon of the activated first data 1011.

Referring to FIG. 10B, the processor may determine whether to activate the first data 1011 of the first object 1010 that is based on the synthesis of the third object 1030. For example, the third object 1030 may be generated through synthesis of the first object 1010 (e.g., home screen) and the second object (not illustrated) (e.g., wallpaper screen, content play screen, or the like) with each other. According to an embodiment, a plurality of second objects may be selected, and may be able to make various screens, such as live wallpaper screen and content play screen. For example, if the predetermined event is detected on the third object 1030, the processor may be configured to execute the second object (not illustrated). The content that can be included in the second data 1021 of the second object may be related to a game application. Referring to FIG. 10B, the second data 1021 of the second object may include a game application. If the predetermined event is detected, the processor may be configured to execute the second data 1021 of the second object on the third object 1030. This case may correspond to the execution of the second object on the third object.

Referring to FIG. 10B, when the predetermined event is detected on the third object 1030, the processor may be configured to perform determination related to the first data together among the third data. For example, if it is determined that the first data 1011 is activated, the processor may be configured to recognize the icon of the first data as an obstacle by performing the second object (e.g., by executing the second data 1021) on the third object 1030 when the predetermined event is detected. The processor may be configured to map a control (e.g., a user's control) of the second data 1021 for the content constituting the second object onto the third object 1030 and the third data. Here, the control of the second data 1021 may be a user's direct touch input being applied to the display of the electronic device or an input by a stylus pen. Any type of input may be possible without limit in case that the input is related to the control of the second data.

Referring to FIG. 10C, when the predetermined event is detected on the third object 1030, the processor may be configured to perform determination related to the first data together among the third data. For example, if it is determined that the first data 1011 is inactivated, the processor may be configured to recognize as if the icon of the first data does not exist by performing the second object (e.g., by executing the second data 1021) on the third object 1030 when the predetermined event is detected. The icon of the first data may be expressed on the third object in a manner that the icon is displayed blurry or in a dotted line. The processor may be configured to map a control (e.g., user's control) of the second data 1021 for the content constituting the second object onto the third object 1030 and the third data. Here, the control of the second data 1021 may be a user's direct touch input being applied to the display of the electronic device or an input by a stylus pen. Any type of input may be possible without limit in case that the input is related to the control of the second data.

Referring to FIGS. 10B and 10C, the processor may determine the active state or inactive state of the first data on the third object. For example, if the user selects (e.g., configures) the activation of the first data of the first object during execution of the second object on the third object, the processor may determine the first data in an active state. Here, the third data may include the first data and the second data, and depending on whether the first data is activated, whether to display or utilize the first data among the third data may differ. If the predetermined event is detected, the processor may execute the second data of the second object on the third object, and may configure to render the third object depending on whether the first data is activated. According to an embodiment, if the first data is determined to be in an active state, the processor may add the first data to the second data to be executed during the execution of the second data on the third object. The addition of the first data to the second data to be executed may correspond to that the display of the icon of the first data is rendered as an obstacle of the second data (e.g., obstacle as the contents of the game application) (e.g., FIG. 10B). According to another embodiment, if the first data is determined to be in an inactive state, the processor may avoid the first data from the second data to be executed during the execution of the second data on the third object. The avoidance of the first data from the second data to be executed may correspond to that the display of the icon of the first data is displayed blurry in executing the second data, and may correspond to the case that the second data is rendered so that it does not serve as the obstacle in executing the second data (e.g., FIG. 10C).

Figure 11A:
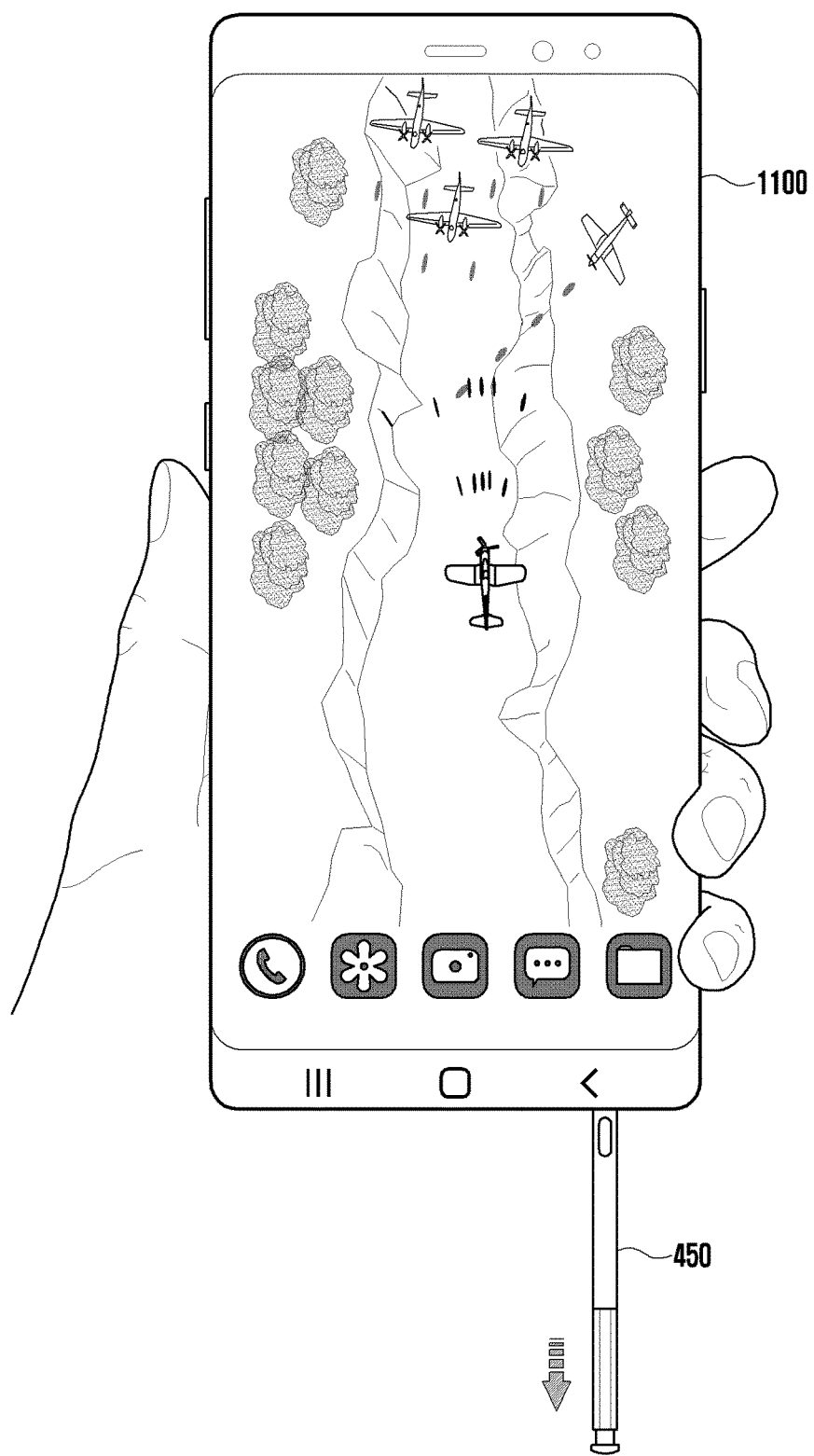
FIG. 11A is a diagram related to a predetermined event in a method for configuring a background screen according to an embodiment of the disclosure.
Figure 11B:
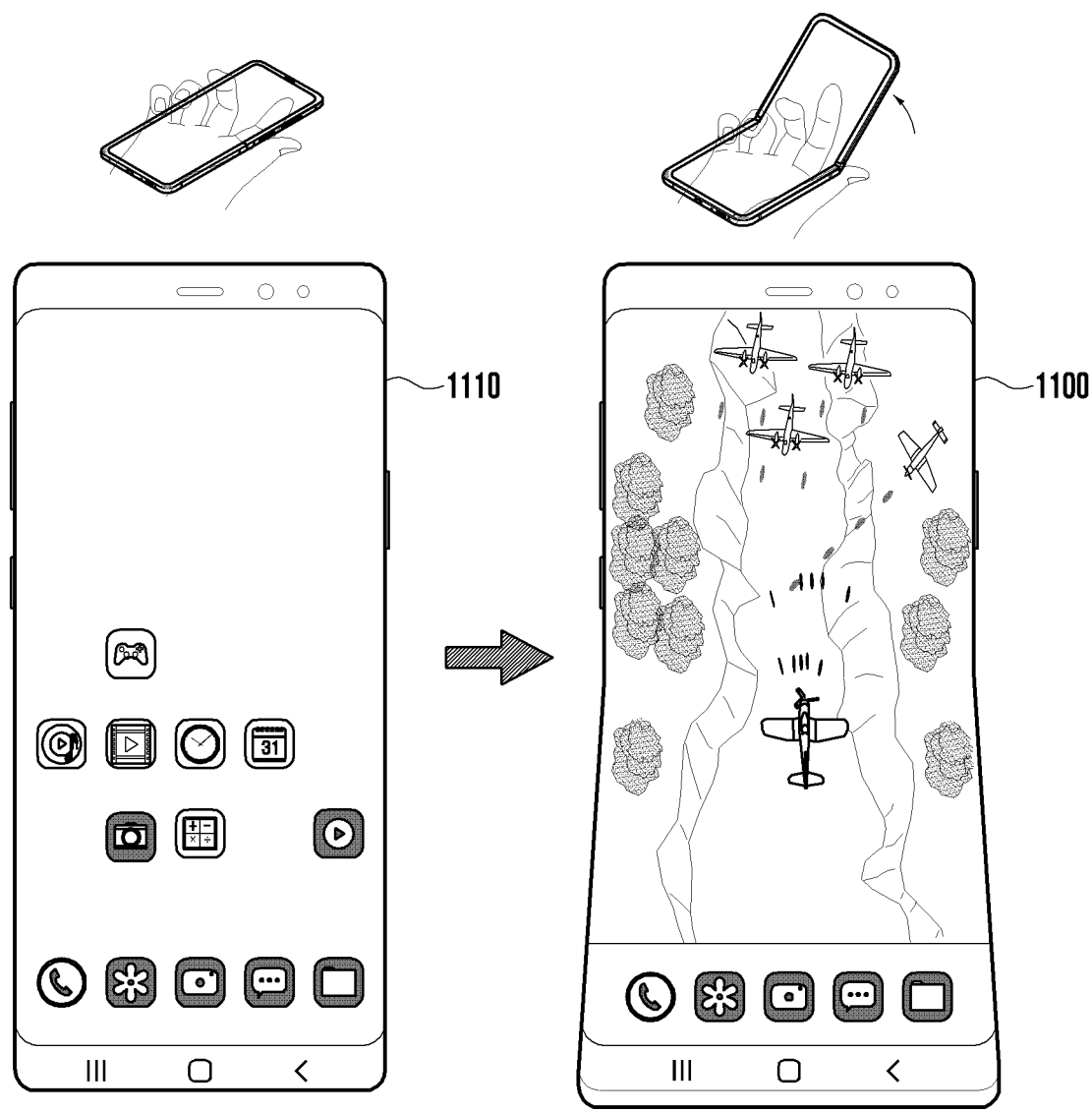
FIG. 11B is a diagram related to a predetermined event in a method for configuring a background screen according to an embodiment of the disclosure.

FIGS. 11A and 11B are diagrams related to a predetermined event in a method for configuring a background screen according to various embodiments of the disclosure.

Referring to FIGS. 11A and 11B, an "event" that becomes a precondition for executing a second object (e.g., second data of a second object) on a third object may be configured in various ways. According to an embodiment, the "event" may correspond to removal (e.g., ejection) of a stylus pen that can be built in an electronic device. According to another embodiment, the "event" may correspond to communication connection between the electronic device and the stylus pen. Here, the stylus pen communication-connected with the electronic device may be a pen that is built in the electronic device or a pen that is not built in the electronic device as an external device. According to another embodiment, the "event" may correspond to a state change of a flexible display constituting the electronic device. According to another embodiment, the "event" may be a release of a lock screen of the electronic device. According to another embodiment, the "event" may include an operation input through a sensor (e.g., an acceleration sensor or gyro sensor) of the electronic device. According to another embodiment, the "event" may be performing of a "home key" button for movement to a background screen during execution of another application. According to another embodiment, the "event" may be the transferring of information (e.g., bio information) from an external electronic device communication-connected with the electronic device.

Referring to FIG. 11A, a processor may detect the ejection of the stylus pen 450 from a stylus pen storage space of the electronic device 1100. For example, the processor may detect the ejection of the stylus pen 450 by detecting a change (e.g., size of an output current) of an induced magnetic field formed through an electromagnetic induction type coil that may configure the storage space of the stylus pen 450. According to an embodiment, if the ejection of the stylus pen 450 is detected, the electronic device 1100 may activate a communication (e.g., Bluetooth low energy (BLE) communication)-connected state of the stylus pen 450 from an idle state to a connected state. According to an embodiment, in case that the ejection of the stylus pen 450 is detected, and the stylus pen 450 deviates from a recognizable range from an electromagnetic induction panel, the electronic device 1100 may activate the communication-connected state from the idle state to the connected state. According to another embodiment, the processor may be configured to detect the ejection of the stylus pen 450 that can be built in the electronic device 1100 without limit in any method capable of detecting the ejection of the stylus pen 450. As another example, the processor may detect a detachable state of the stylus pen 450 attached to a housing (e.g., front, side, or rear) of the electronic device 1100 using a sensor (e.g., hall sensor).

Referring to FIG. 11B, the processor may detect a state change of a display of the electronic device 1100. For example, the processor may detect whether the display is in a folded state, unrolled state, or slide-out state. In case of detecting the state change of the display as a predetermined event, the processor may be configured to execute a second object (e.g., second data of the second object) on a third object 1110.

According to various embodiments, the processor may detect a communication connection with an external device (e.g., stylus pen). The stylus pen may be provided in a manner capable of being stored in the electronic device 1100, or may be provided as an external device separate from the electronic device 1100. According to an embodiment, the processor may detect the communication connection between the stylus pen and the electronic device 1100. Here, the ejection of the stylus pen from the electronic device 1100 may not be separately detected. The communication connection between the electronic device 1100 and the stylus pen may be used without limit in case of a short-range communication-connectable method. According to another embodiment, the processor may detect the communication connection with an external device (e.g., stylus pen or a wearable device) provided separately from the electronic device 1100. Here, the communication connection may be used without limit in case of the short-range communication-connectable method.

According to various embodiments, the processor of the electronic device 1100 may be configured to execute various kinds of objects when detecting the execution of the predetermined event. For example, if the execution of the predetermined event is detected on the third object, the second object may be executed. Here, the second object is not limited to that according to embodiments of FIGS. 11A and 11B, and various objects may be executed to overlap each other. According to an embodiment, if the execution of the predetermined event is detected, the processor of the electronic device 1100 may be configured to display, on the display, a user interface (UI) for selection of the second object (e.g., second data of the second object). For example, the processor may display selection of various applications or commands, such as execution of a game application among the second data of the second object, execution of a memo application, or execution of an air-commander.

Figure 12A:
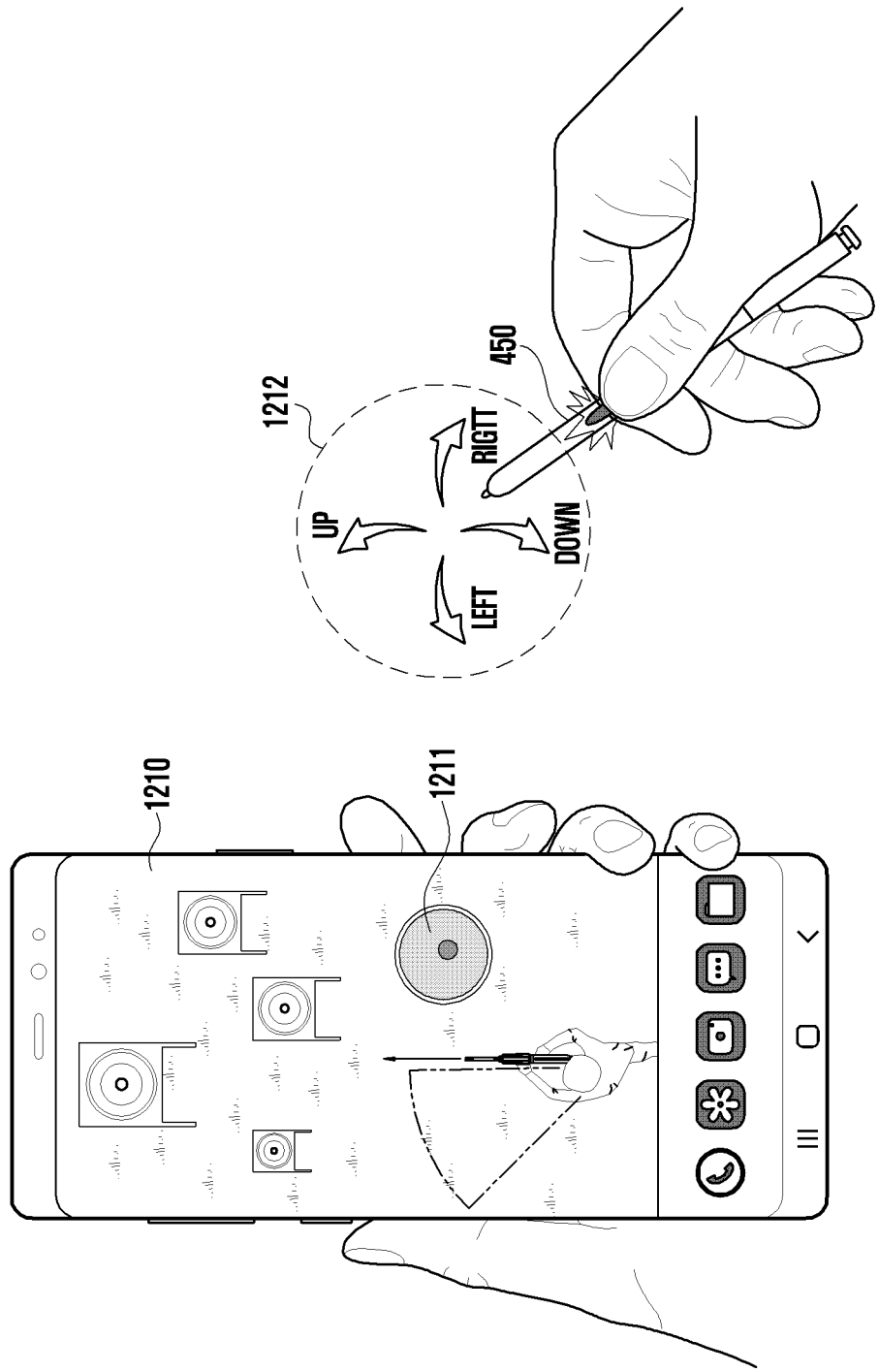
FIG. 12A is a diagram of an interaction according to an input of a stylus pen onto an electronic device according to an embodiment of the disclosure.
Figure 12B:
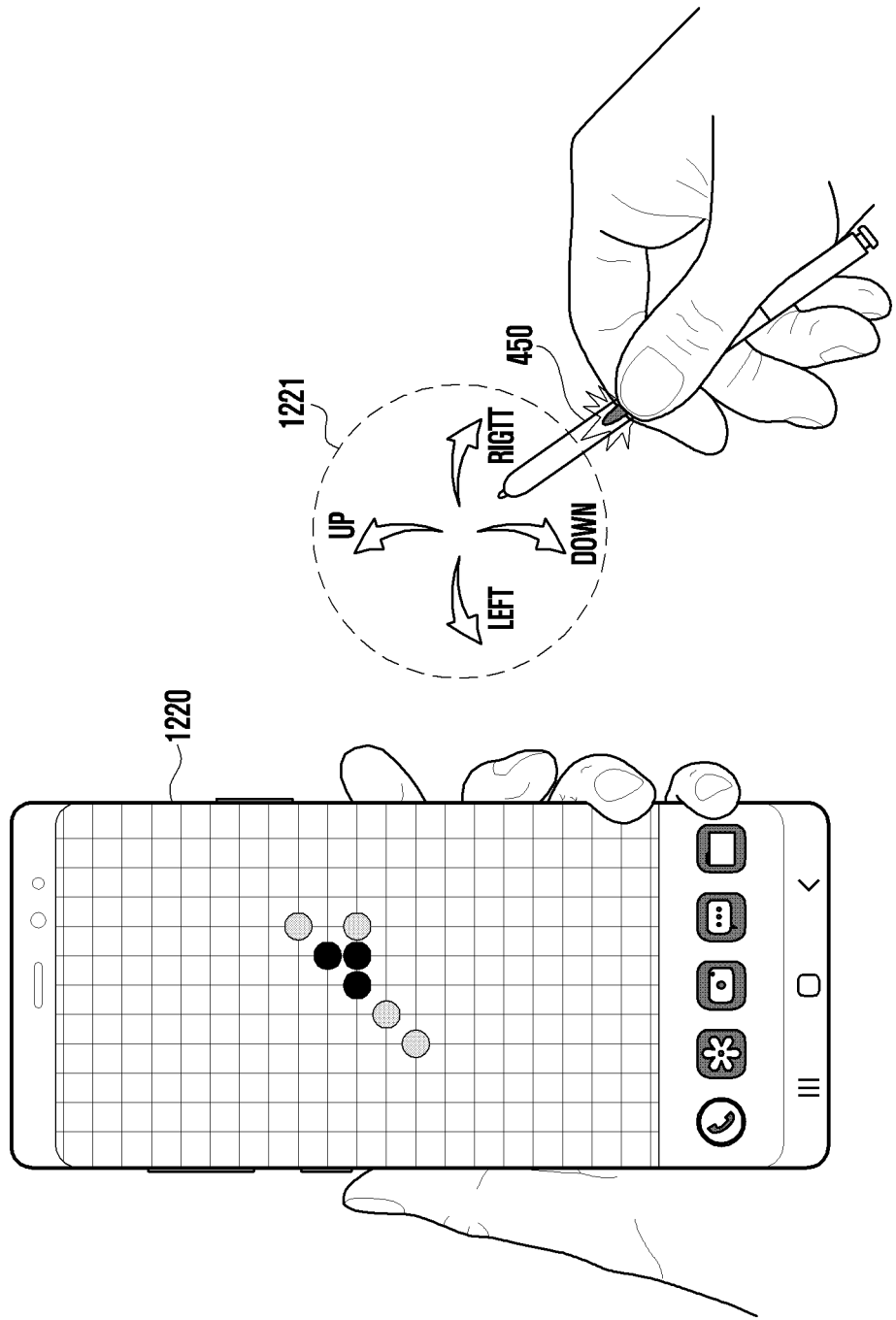
FIG. 12B is a diagram of an interaction according to an input of a stylus pen onto an electronic device according to an embodiment of the disclosure.

FIGS. 12A and 12B are diagrams of an interaction according to an input of a stylus pen onto an electronic device according to various embodiments of the disclosure.

Referring to FIG. 12A, a processor of an electronic device may detect an execution of a predetermined event by detecting ejection of a stylus pen or communication connection with the stylus pen. According to an embodiment, if the execution of the predetermined event is detected, the processor of the electronic device may be configured to execute second data 1210 of a second object on a third object. If the predetermined event is detected, the processor of the electronic device may be configured to replace a control necessary to execute the second data by an input from the stylus pen on behalf of the electronic device. According to another embodiment, the processor of the electronic device may be configured to perform the control necessary to execute the second data through a control input portion 1211 of the electronic device or a sensor, such as a gyro sensor or an acceleration sensor. According to an embodiment, if the ejection of the stylus pen from the electronic device is detected, the stylus pen may activate the acceleration sensor, and may activate the gyro sensor in response to pressing of a button of the stylus pen.

According to various embodiments, if the processor of the electronic device detects the predetermined event and identifies an input from the communication-connected stylus pen 450, the processor may be configured to map an input through the sensor (e.g., a gyro sensor and/or acceleration sensor) and/or the button of the stylus pen onto the second data 1210. For example, in case that the button of the stylus pen 450 is pressed and a gesture input 1212 of up, left, down, and right is performed, the processor of the electronic device may be configured to reflect the gesture input 1212 in the control for the second data 1210. Here, the gesture input 1212 through the stylus pen 450 may correspond to an input through the control input portion 1211 in the electronic device of the second data 1210.

Referring to FIG. 12A, if the gesture input 1212 through the stylus pen 450 communication-connected with the electronic device is performed, the processor of the electronic device may receive sensing data of the gyro sensor (not illustrated) and/or acceleration sensor, which may be built in the stylus pen 450. For example, the electronic device and the external device (e.g., stylus pen 450) may be communication-connected with each other through a short-range communication module. The processor of the electronic device may be configured so that the processor built in the stylus pen receives, through the short-range communication module, data detected through the sensor (e.g., gyro sensor and/or acceleration sensor) of the stylus pen or sensing data of the sensor (e.g., gyro sensor and/or acceleration sensor) of the stylus pen. According to an embodiment, if a user of the electronic device performs the gesture input 1212 through pressing of the button of the stylus pen 450, it may be possible to control the content on the second data 1210 of the second object. For example, in case that the user should hit the target by executing a game application (e.g., second data 1210), it may be possible to control to aim and fire by performing the gesture input 1212 of the stylus pen 450.

According to various embodiments, an interaction for mapping the gesture input 1212 of the stylus pen 450 communication-connected with the electronic device onto the second data 1210 may not be limited to the game application. For example, the second object that can be synthesized with the third object and the second data that can be included in the second object may utilize utilities of various applications, and thus the interaction between the electronic device and the stylus pen 450 may be performed in a non-overlapping range.

According to various embodiments, an interaction related to the gesture input of the stylus pen 450 for the second data 1220 of the second object of the electronic device may be selectively performed. Referring to FIG. 12B, in case that the second data 1220 is content that can be input through the sensor (e.g., a gyro sensor and/or acceleration sensor), an input may be performed through the sensor (e.g., gyro sensor and/or acceleration sensor) of the electronic device and/or the sensor (e.g., gyro sensor and/or acceleration sensor) of the stylus pen 450. For example, in case that the second data 1220 requires a control for selecting a location of a go stone (i.e., baduk stone), it is possible to control the second data through the sensor (e.g., the gyro sensor) of the electronic device by tilting the electronic device. According to another embodiment, in case that the second data 1220 requires the control for selecting the location of the go stone, it may be configured to control the second data 1220 through an input through the sensor (e.g., gyro sensor and/or acceleration sensor) of the stylus pen 450 by performing the gesture input 1221 while pressing the button of the stylus pen 450.

According to various embodiments, the control of the second data of FIG. 12B may correspond to an input of a next stroke (e.g., location selection on a checkerboard) of a black go stone. For example, the user can control the second data 1220 using the electronic device and/or stylus pen. According to an embodiment, in case that the user of the electronic device does not press the button of the stylus pen 450 communication-connected with the electronic device, it may be configured to control the second data 1220 by a touch input on the display of the electronic device and/or an input through the acceleration sensor of the electronic device. According to another embodiment, in case of detecting the input (e.g., button pressing) for the button of the stylus pen 450 communication-connected with the electronic device, the processor of the electronic device may be configured to control the second data through an indirect input through the stylus pen rather than a direct input for the electronic device.

According to an embodiment, in case of controlling the second data of the second object on the synthesized third object, the indirect input (e.g., input using short-range communication) through the stylus pen 450 and the direct input (e.g., touch input or input using EMR of a pen) through the electronic device may not overlap each other. According to another embodiment, in case that the indirect input is performed through the stylus pen 450, a scroll (e.g., corresponding to right and left scrolls of the display) for changing the page of the home screen on the third object and the gesture input of the stylus pen may not overlap each other. As described above, in the interaction with the electronic device, inputs through the stylus pen 450 may be configured so that the input through the stylus pen and another input do not conflict with each other.

Figure 13:
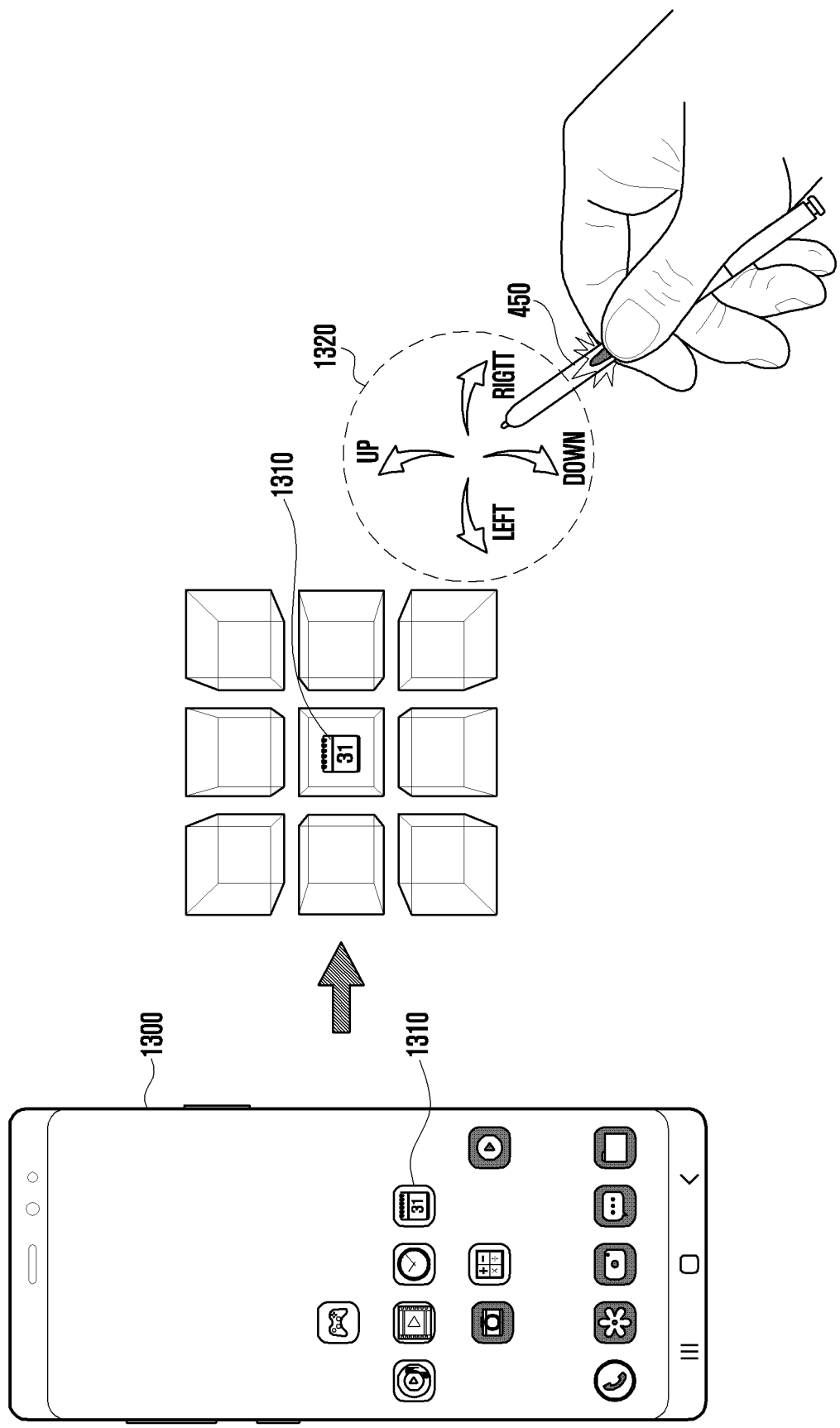
FIG. 13 is a diagram of a stereoscopic screen configuration according to an input of a stylus pen onto an electronic device according to an embodiment of the disclosure.

FIG. 13 is a diagram of a stereoscopic screen configuration according to an input of a stylus pen onto an electronic device according to an embodiment of the disclosure.

Referring to FIG. 13, attribute information for third data 1310 may be configured and displayed as a stereoscopic screen (e.g., 3D screen) on a third object 1300. According to an embodiment, the attribute information for the third data 1310 may be one-point-projected as the stereoscopic screen. For example, if an input for an icon of the third data 1310 is detected, the attribute information may be displayed as a cubic stereoscopic model around 8 cardinal points. According to an embodiment, the third data 1310 (e.g., application) may be a calendar application. For example, if the third data 1310 is the calendar application, information about a download date of the calendar application, a calendar screen of the previous month (e.g. June 2020) of the current date (e.g., in case of July 2020), a main schedule of this month (e.g., July 2020), a main schedule of the previous week, a preview screen (e.g., a calendar screen of July 2020) during execution, a main schedule of last month, a calendar screen of the next month (e.g., August 2020) after the current date, or a main schedule of a next week may be displayed as the stereoscopic screen in order in 8 spaces from the top left cardinal point to the bottom right cardinal point. According to another embodiment, the attribute information that is configured and displayed as the stereoscopic screen may be differently configured in accordance with the kind of application of the third data 1310 that may be included in the third object.

Referring to FIG. 13, an input for application icon selection intended to identify the attributes among the third data 1310 on the third object 1300 may be performed through the stylus pen communication-connected with the electronic device. According to an embodiment, the control of the third data using the stylus pen may correspond to the indirect input. For example, the input for selecting the third data 1310 on the third object 1300 may be the direct input through the touch input for the electronic device. According to another embodiment, the input for selecting the third data 1310 on the third object 1300 may be the indirect input through the stylus pen communication-connected with the electronic device. For example, if the user presses the button of the stylus pen, it may be configured to perform the input through the stylus pen. According to various embodiments, the direct input and the indirect input for the third data 1310 may be configured not to conflict with each other. Further, if performing of the input through the stylus pen is detected, the processor of the electronic device may be configured so that the input being interacted with the stylus pen does not conflict with other inputs.

Referring to FIG. 13, in case that the attribute information for the third data 1310 is configured and displayed as the stereoscopic screen on the third object 1300, it may be possible to perform the input for identifying the attribute information for the third data through the stylus pen communication-connected with the electronic device. According to an embodiment, configuring of the attribute information display of the selected third data 1310 as the stereoscopic screen may be limited only to a case where the input through the stylus pen is detected. For example, if the user clicks the button of the stylus pen (e.g., button press) on the third object 1300, an input means in the form of a mouse is activated on the display of the electronic device, and the input means (e.g., in the form of a mouse) may be controlled in accordance with the gesture input 1320 of the stylus pen. According to another embodiment, the user may perform the gesture input 1320 of the stylus pen to correspond to the touch input on the display of the electronic device in a state where the user is clicking the button of the stylus pen (e.g., while pressing the button) on the third object 1300.

Referring to FIG. 13, for the indirect input for the third data 1310 on the third object 1300, the user may activate the input means (e.g., input means in the form of a mouse) by clicking the button of the stylus pen. According to an embodiment, the user may activate the input means by clicking the button of the stylus pen, and may perform movement of the input means through the sensor (e.g., gyro sensor and/or acceleration sensor) of the stylus pen. The movement of the input means through the sensor (e.g., gyro sensor and/or acceleration sensor) of the stylus pen may be performed corresponding to the gesture input 1320 of the stylus pen.

Referring to FIG. 13, if the user performs an input for selecting the third data (e.g., hold input of the button of the stylus pen) by activating the input means through clicking of the button of the stylus pen, it may be configured that the attribute information of the third data is displayed as the stereoscopic screen. As described above, the input for displaying the attribute information of the third data as the stereoscopic screen may be performed by long-press as the direct input for the display of the electronic device, hold or long-press of the button of the stylus pen, or both of them. However, the input method as described above has no restrictions, and may be customized by the user and may be changed by all means in a range in which the direct input and the indirect input do not conflict with each other. The interaction with the electronic device through the stylus pen (e.g., activation of the input means, movement of the activated input means, or input through the gyro and/or acceleration sensor of the stylus pen) can be changed in a range in which the interaction does not conflict with a predetermined input.

According to various embodiments, the input through the stylus pen according to the disclosure may not be limited to the indirect input. For example, the user can directly apply an input to the display of the communication-connected electronic device using the stylus pen. Here, direct applying of the input is the input through a nib part of the stylus pen, and may correspond to the user's display touch input.

FIG. 14 is a diagram of an interaction for a predetermined event in a method for configuring a background screen according to an embodiment of the disclosure.

Referring to FIG. 14, according to various embodiments, a third object 1400 may be displayed as a screen on which a home screen and a live wallpaper are synthesized with each other. If an execution of a predetermined event is detected, a processor of an electronic device may be configured to switch a main screen of the third object 1400 to another screen (e.g., screen of a second object or second data execution screen of the second object). According to an embodiment, if the execution of the predetermined event is detected, the processor of the electronic device may be configured to switch the third object 1400 to a screen 1410 of a memo application. For example, an ejection operation of the stylus pen 450 stored in or attached to the electronic device may be configured as the predetermined event. In this case, if the ejection of the stylus pen 450 is detected, the processor of the electronic device may switch the main screen of the third object 1400 to the screen of the second object 1410 (e.g., second data execution screen of the second object).

According to another embodiment, the processor of the electronic device may detect the execution of another predetermined event in addition to the ejection of the stylus pen 450. The predetermined event may be customized in accordance with a user's configuration change. The second data execution screen of the second object according to the input of the stylus pen 450 may be configured to be mapped on the third object.

Referring to FIG. 14, the second object (e.g., the content of the screen being switched) that is executed through detection of the ejection of the stylus pen 450 may be selected by the user. For example, the user may select one or more second objects to be used for synthesis of the third object 1400, and may finely control the second data (e.g., an application or a particle in the application) of the selected second object.

According to various embodiments, the input for the click (e.g., pressing) of the stylus pen may be changed according to the user's configuration. For example, if the button of the stylus pen communication-connected with the electronic device is once pressed for a short time (e.g., less than one second), various configurations become possible in a manner that an input type in a mouse shape is displayed on the display of the electronic device, the mode is switched to a mode (e.g., a gesture separate from the input type in the mouse shape) in which the gesture operation can be inputted, or a favorites menu of an air-commander type is activated. The configuration for the input of the stylus pen may be collectively applied during initial providing of the electronic device, or may be customized by changing the configuration in a process in which the user uses the electronic device.

The electronic device 101 according to various embodiments has a bar type or plate type appearance, but the disclosure is not limited thereto. For example, the illustrated electronic device may be a part of a rollable electronic device or a foldable electronic device. The "rollable electronic device" may mean an electronic device in which the display (e.g., display 420 of FIG. 4) can be deformed to be bent and at least a part of the display is wound or rolled to be stored inside the housing. As needed by the user, the rollable electronic device has an extended screen display area by unfolding the display or exposing a wider area of the display to an outside. The foldable electronic device may mean an electronic device in which two different areas of the display are foldable to face each other or in a direction opposite to each other. In general, in a carrying state, the display of the foldable electronic device is folded to face each other or in the direction opposite to each other, whereas in an actual usage state, the user unfolds the display so that the two different areas are substantially in a flat shape. In a certain embodiment, the electronic device 101 according to various embodiments disclosed in this document may be interpreted to include not only a portable electronic device, such as a smart phone, but also other various electronic devices, such as a notebook computer and a home appliance.

An electronic device (e.g., electronic device 101 of FIG. 1) according to various embodiments of the disclosure may include: a display (e.g., display 420 of FIG. 4); and a processor (e.g., processor 410 of FIG. 4), wherein the processor is configured to: identify a first object (e.g., first object 510 of FIG. 5) and first data (e.g., first data 511 and 512 of FIG. 5) for content constituting the first object, receive an input for selecting a second object (e.g., second object 710 to 760 of FIGS. 7A and 7B), generate a third object (e.g., third object 1030 in FIGS. 10A to 10C) by synthesizing the second object based on the first object, display, on the display, third data for the generated third object and content constituting the third object, execute the second object on the displayed third object in case of detecting an occurrence of a predetermined event, and map a control of second data for content constituting the executed second object onto the third object and the third data.

The processor of the electronic device according to various embodiments of the disclosure may determine an active state or an inactive state of the first data, and render the third object in accordance with the determined state.

The first object of the electronic device according to various embodiments of the disclosure may include a home screen layer, and the processor may scale the second data for the content constituting the second object further based on a location and an area of the first data.

The electronic device according to various embodiments of the disclosure may further include a sensor module, a short-range communication module, and a stylus pen, and the predetermined event may include at least one of an ejection of the stylus pen from the electronic device, a communication connection between the electronic device and the stylus pen, or a state change of the display.

The processor of the electronic device according to various embodiments of the disclosure may map the control of the second data for the content constituting the second object onto the third object and the third data corresponding to an input of the stylus pen.

The input of the stylus pen of the electronic device according to various embodiments of the disclosure may include at least one of a button input, a gesture input, or an acceleration input.

The processor of the electronic device according to various embodiments of the disclosure may display information related to an attribute of the third data selected by a selection input by the stylus pen or a user's touch in a 3D form seen through centering around an icon of the selected third data.

The processor of the electronic device according to various embodiments of the disclosure may detect a user's input including an input by a touch, a gesture input, or an acceleration input through the sensor module until an input of the stylus pen is detected, and map the control of the second data for the content constituting the second object onto the third object and the third data corresponding to the user's input.

The processor of the electronic device according to various embodiments of the disclosure may add the first data to the second data and execute the second data when executing the second data for the content constituting the second object on the third object in case that the active state is determined.

The processor of the electronic device according to various embodiments of the disclosure may avoid the first data from the second data and execute the second data when executing the second data for the content constituting the second object on the third object in case that the inactive state is determined.

A method for configuring a background screen of an electronic device (e.g., electronic device 101 of FIG. 1) according to various embodiments of the disclosure may include: identifying a first object (e.g., first object 510 of FIG. 5) and first data (e.g., first data 511 and 512 of FIG. 5) for content constituting the first object; receiving an input for selecting a second object (e.g., second object 710 to 760 of FIGS. 7A and 7B); generating a third object (e.g., third object 1030 of FIGS. 10A to 10C) by synthesizing the second object based on the first object; displaying, on a display, third data for the generated third object and content constituting the third object; executing the second object on the displayed third object in case of detecting an occurrence of a predetermined event; and mapping a control of second data for content constituting the executed second object onto the third object and the third data.

The method according to various embodiments of the disclosure may further include: determining an active state or an inactive state of the first data; and rendering the third object in accordance with the determined state.

The method according to various embodiments of the disclosure may further include scaling the second data for the content constituting the second object further based on a location and an area of the first data.

In the method according to various embodiments of the disclosure, executing the second object may include detecting an occurrence of the predetermined event including at least one of an ejection of the stylus pen from the electronic device, a communication connection between the electronic device and the stylus pen, or a state change of the display.

In the method according to various embodiments of the disclosure, mapping may include mapping the control of the second data for the content constituting the second object onto the third object and the third data corresponding to an input of the stylus pen.

In the method according to various embodiments of the disclosure, mapping may include at least one of mapping a button input of the stylus pen, mapping a gesture input of the stylus pen, or mapping an acceleration input of the stylus pen.

The method further includes displaying information related to an attribute of the third data selected by a selection input by the stylus pen or a user's touch in a 3D form seen through centering around an icon of the selected third data.

In the method according to various embodiments of the disclosure, mapping may include: detecting a user's input including an input by a touch, a gesture input, or an acceleration input through the sensor module until an input of the stylus pen is detected; and mapping the control of the second data for the content constituting the second object onto the third object and the third data corresponding to the user's input.

In the method according to various embodiments of the disclosure, determining may include determining the active state of the first data, and further include adding the first data to the second data and executing the second data when executing the second data for the content constituting the second object on the third object.

In the method according to various embodiments of the disclosure, determining may include determining the inactive state of the first data, and further include avoiding the first data from the second data and executing the second data when executing the second data for the content constituting the second object on the third object.

In the method according to various embodiments of the disclosure, the avoiding of the first data from the second data comprises displaying the first data blurred.

In the method according to various embodiments of the disclosure, the second object is a live wallpaper screen and the first object is a home screen.

In the method according to various embodiments of the disclosure, the home screen corresponds to a screen comprising a plurality of layers.

In the method according to various embodiments of the disclosure, the live wallpaper is implemented by representing an animation effect through application of a touch event or by using parallax.

In the method according to various embodiments of the disclosure, the method further comprises synthesizing a plurality of objects by three dimensional (3D) vertical floating The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display; and
a processor,
wherein the processor is configured to:
identify a first object and first data for content constituting the first object,
receive an input for selecting a second object,
generate a third object by synthesizing the second object based on the first object,
detect whether a predetermined event has occurred,
display, on the display, third data on the third object in a manner that only the first data is displayed on a main home screen based on a non-occurrence of the predetermined event,
display, on the display, the third data for the generated third object and content constituting the third object based on the occurrence of the predetermined event,
execute the second object on the displayed third object in case of detecting the occurrence of a predetermined event, and
map a control of second data for content constituting the executed second object onto the third object and the third data.

2. The electronic device of claim 1, wherein the processor is further configured to:
determine an active state or an inactive state of the first data, and
render the third object according to the determined state.

3. The electronic device of claim 2, wherein the processor is further configured to:
add the first data to the second data, and
execute the second data when executing the second data for the content constituting the second object on the third object in case that the active state is determined.

4. The electronic device of claim 2, wherein the processor is further configured to:
avoid the first data from the second data, and
execute the second data when executing the second data for the content constituting the second object on the third object in case that the inactive state is determined.

5. The electronic device of claim 1,
wherein the first object comprises a home screen layer, and
wherein the processor is further configured to scale the second data for the content constituting the second object further based on a location and an area of the first data.

6. The electronic device of claim 1, further comprising:
a sensor module;
a short-range communication module; and
a stylus pen,
wherein the predetermined event includes at least one of an ejection of the stylus pen from the electronic device, a communication connection between the electronic device and the stylus pen, or a state change of the display.

7. The electronic device of claim 6, wherein the processor is further configured to map the control of the second data for the content constituting the second object onto the third object and the third data corresponding to an input of the stylus pen.

8. The electronic device of claim 7, wherein the input of the stylus pen comprises at least one of a button input, a gesture input, or an acceleration input.

9. The electronic device of claim 6, wherein the processor is further configured to display information related to an attribute of the third data selected by a selection input by the stylus pen or a user's touch in a three dimensional (3D) form seen through centering around an icon of the selected third data.

10. The electronic device of claim 6, wherein the processor is further configured to:
detect a user's input including an input by a touch, a gesture input, or an acceleration input through the sensor module until an input of the stylus pen is detected, and
map the control of the second data for the content constituting the second object onto the third object and the third data corresponding to the user's input.

11. A method for configuring a background screen of an electronic device, the method comprising:
identifying a first object and first data for content constituting the first object;
receiving an input for selecting a second object;
generating a third object by synthesizing the second object based on the first object;
detecting whether a predetermined event has occurred;
displaying, on a display, third data on the third object in a manner that only the first data is displayed on a main home screen based on a non-occurrence of the predetermined event;
displaying, on the display, the third data for the generated third object and content constituting the third object based on the occurrence of the predetermined event;
executing the second object on the displayed third object in case of detecting the occurrence of the predetermined event; and
mapping a control of second data for content constituting the executed second object onto the third object and the third data.

12. The method of claim 11, further comprising:
determining an active state or an inactive state of the first data; and
rendering the third object according to the determined state.

13. The method of claim 12, wherein the determining comprises:
determining the active state of the first data;
adding the first data to the second data; and
executing the second data when executing the second data for the content constituting the second object on the third object.

14. The method of claim 12, wherein the determining comprises:
determining the inactive state of the first data;
avoiding the first data from the second data; and
executing the second data when executing the second data for the content constituting the second object on the third object.

15. The method of claim 11, further comprising scaling the second data for the content constituting the second object further based on a location and an area of the first data.

* * * * *